(12) United States Patent
Portolés Griñán et al.

(10) Patent No.: US 11,555,529 B2
(45) Date of Patent: Jan. 17, 2023

(54) WIRE TERMINATOR DEVICE

(71) Applicant: SHINY WORKS, S.L., Paiporta (ES)

(72) Inventors: Luis Portolés Griñán, Paiporta (ES); Ricardo VerdúÁlvaro, Paiporta (ES); Luis Marín Mateos-Aparicio, Paiporta (ES)

(73) Assignee: SHINY WORKS, S.L., Paiporta (ES)

( * ) Notice: Subject to any disclaimer, the term of this patent is extended or adjusted under 35 U.S.C. 154(b) by 596 days.

(21) Appl. No.: 16/473,654

(22) PCT Filed: Dec. 26, 2017

(86) PCT No.: PCT/ES2017/070848
§ 371 (c)(1),
(2) Date: Jun. 26, 2019

(87) PCT Pub. No.: WO2018/122431
PCT Pub. Date: Jul. 5, 2018

(65) Prior Publication Data
US 2019/0346018 A1     Nov. 14, 2019

(30) Foreign Application Priority Data
Dec. 28, 2016   (ES) ............................... ES201631697

(51) Int. Cl.
*F16G 11/04*   (2006.01)
*F16G 11/10*   (2006.01)
(Continued)

(52) U.S. Cl.
CPC .......... *F16G 11/04* (2013.01); *E04H 17/261* (2013.01); *F16G 11/10* (2013.01); *F16G 11/14* (2013.01)

(58) Field of Classification Search
CPC .......... F16G 11/04; F16G 11/10; F16G 11/14; F16G 11/103; E04H 17/261; A01K 3/005
See application file for complete search history.

(56) References Cited

U.S. PATENT DOCUMENTS 3,749,820 A * 7/1973 Langlie ................. A01K 3/005
                                                          174/163 F
3,820,758 A * 6/1974 Berg ..................... A01K 3/005
                                                          256/10

(Continued)

FOREIGN PATENT DOCUMENTS

| GB | 2446501 A | 8/2008 |
| JP | S4890074 U | 10/1973 |
| JP | S4887468 A | 11/1973 |

OTHER PUBLICATIONS

International Search Report for PCT/ES2017/070848 dated Apr. 5, 2018.

*Primary Examiner* — David M Upchurch
(74) *Attorney, Agent, or Firm* — Brown & Michaels, PC

(57) ABSTRACT

A wire terminator device for fences and barriers which has two bodies. The first body houses a wire retaining mechanism and the second body stems from the first body and includes an engagement element where the wire is retained in the usage position. The engagement element forming the second body is defined by a through passage in the direction of passage of the wire and a single inlet groove that is oblique with respect to the direction of passage of the wire. The single inlet groove is arranged in the same plane of the direction of passage of the wire in the usage position.

12 Claims, 35 Drawing Sheets

(51) Int. Cl.
*F16G 11/14* (2006.01)
*E04H 17/26* (2006.01)

(56) References Cited

U.S. PATENT DOCUMENTS

| | | | | |
|---|---|---|---|---|
| 4,077,611 A * | 3/1978 | Wilson | ............ | A01K 3/005 |
| | | | | 174/163 F |
| 4,621,783 A * | 11/1986 | Wier | ............ | A47B 57/56 |
| | | | | 174/163 F |
| 4,771,137 A * | 9/1988 | Thompson | ............ | H01B 17/145 |
| | | | | 174/163 F |
| 4,973,029 A * | 11/1990 | Robbins, III | ............ | A01K 3/005 |
| | | | | 174/120 SC |
| 4,982,932 A * | 1/1991 | Baker | ............ | E04H 17/12 |
| | | | | 174/154 |
| 5,032,693 A * | 7/1991 | Langlie | ............ | H01B 17/145 |
| | | | | 174/158 F |
| 6,290,190 B1 * | 9/2001 | Kendall | ............ | A01K 3/005 |
| | | | | 174/158 R |
| D474,152 S * | 5/2003 | Burdick | ............ | D13/132 |
| 6,563,055 B1 * | 5/2003 | Burdick | ............ | H01B 17/145 |
| | | | | 174/138 G |
| 6,583,363 B1 * | 6/2003 | Wilson, Jr. | ............ | H01B 17/145 |
| | | | | 174/158 F |
| D669,437 S * | 10/2012 | Wilson, Jr. | ............ | D13/129 |
| 9,679,682 B2 * | 6/2017 | Wall | ............ | H01B 17/145 |
| 2004/0195556 A1 * | 10/2004 | Facey | ............ | F16G 11/02 |
| | | | | 256/10 |
| 2006/0202181 A1 * | 9/2006 | Tamez | ............ | E04H 17/26 |
| | | | | 256/1 |
| 2008/0308299 A1 * | 12/2008 | Gallagher | ............ | A01K 3/005 |
| | | | | 174/168 |
| 2010/0038611 A1 * | 2/2010 | Lambourn | ............ | E04H 17/266 |
| | | | | 256/53 |
| 2018/0223560 A1 * | 8/2018 | Malins | ............ | A01K 3/005 |

* cited by examiner

301

301

WIRE TERMINATOR DEVICE

FIELD OF THE ART

The present invention relates to a wire terminator device such as those used for securing a trellis wire, a fencing wire, a vineyard wire, livestock fencing wire, or any other type of wire used in fencing that includes posts.

STATE OF THE ART

Different types of wire terminator devices are known in the state of the art, such as for example in document GB 2 378 213 which describes a body having a first through-bore in which there protrude retention means urged by means of springs, and a second through-bore without retention means, the second through-bore being interrupted by a transverse notch in the body having a width proportional to the diameter of the horizontal wires of a livestock fence in which the device can be used. This device can be used for abutting with a post having a hole through which the wire is passed before being inserted into the terminator device.

Moreover, document ES 2 379 025 T3 is also known to additionally comprise a second through-bore without retention means which allows using the device for securing one end of the wire to a post without any hole, passing the wire through the second through-bore, and then around the post, and finally through the bore with the retention means.

To adapt a retention device such as the one described for quick and simple installation on a livestock fence with a plurality of linear or horizontal wires and separate vertical wires secured to the horizontal wires either by twisting them around same or by means of a separate piece of wire twisted around the intersecting point. The problem with this structure is that when performing a termination operation around a post, too much time and effort are used to remove the vertical wires for the purpose of assuring that an end of each horizontal wire goes through the second through-bore of the device, then around the post at the end, and finally through the bore with the retention means. To that end, document ES 2 379 025 T3 proposes for the second through-bore to be interrupted by a transverse notch in the body having a width proportional to the diameter of the horizontal wires of a livestock fence with which this device will be used. Furthermore, each part of the body separated by the notch is provided with a longitudinal inlet groove in the second through-bore proportional to the diameter of said horizontal wires, with the groove in one part on the opposite side of the body with respect to the groove in the other part.

Nevertheless, when introducing the cable in the longitudinal groove, as the grooves on either side of the mentioned second bore are arranged on opposite sides, the entire body must be placed rotated such that it requires subsequent rotation back to the working position. This way of placing the cable in the device is rather unintuitive and constitutes a rather unnatural movement in the installation, which significantly hinders use.

DESCRIPTION OF THE INVENTION

The object of the present invention relates to a wire terminator device for barriers and fencing, said device comprising two bodies, wherein the first body houses a wire retaining mechanism such as the one described in document ES 2 284 365, and a second body essentially in the form of an engagement element in which a cable or wire is housed in the usage position. The second body moreover comprises a through passage in the direction of the wire without any type of retention, with the particularity of comprising a single inlet groove that is oblique with respect to the direction of the wire, and wherein said groove is arranged in the same plane of passage of the wire.

This structure has an advantageous geometry with respect to the terminal devices described in the state of the art. In that sense, for example, the oblique groove in combination with the geometry of the openings facilitates assembly in the first instance of the terminator device, such that the passage of a terminal end of the cable through the first body so that it is retained therein is then made possible.

More specifically, compared to the device described in document ES 2 379 025 T3, the present invention presents an engagement system (the second body) with a through passage in the direction of the wire and an open groove that is oblique with respect to the direction of the wire, but in one and the same plane, i.e., the openings are not opposite one another like in document ES 2 379 025 T3, facilitating the assembly thereof as the cable is fitted into the second body by simply inclining the part in the same plane of the forward movement, so rotation of the assembly of the body will not be necessary, the cable being retained in the through passage when the part goes back to its original inclination. The entire operation is simpler and more intuitive for the user as it is performed in the same plane of the wire.

Throughout the description and the claims, the word "comprises" and variants thereof do not seek to exclude other technical features, additions, components, or steps. For those skilled in the art, other objects, advantages, and features of the invention will be inferred in part from the description and in part from the practice of the invention. The following examples and drawings are provided by way of illustration and do not seek to restrict the present invention. Furthermore, the present invention covers all the possible combinations of particular and preferred embodiments herein indicated.

BRIEF DESCRIPTION OF THE DRAWINGS

A series of drawings which help to better understand the invention and relate expressly to an embodiment of said invention provided as a non-limiting example thereof are very briefly described below.

DESCRIPTION OF A DETAILED EMBODIMENT OF THE INVENTION

Figure 1:
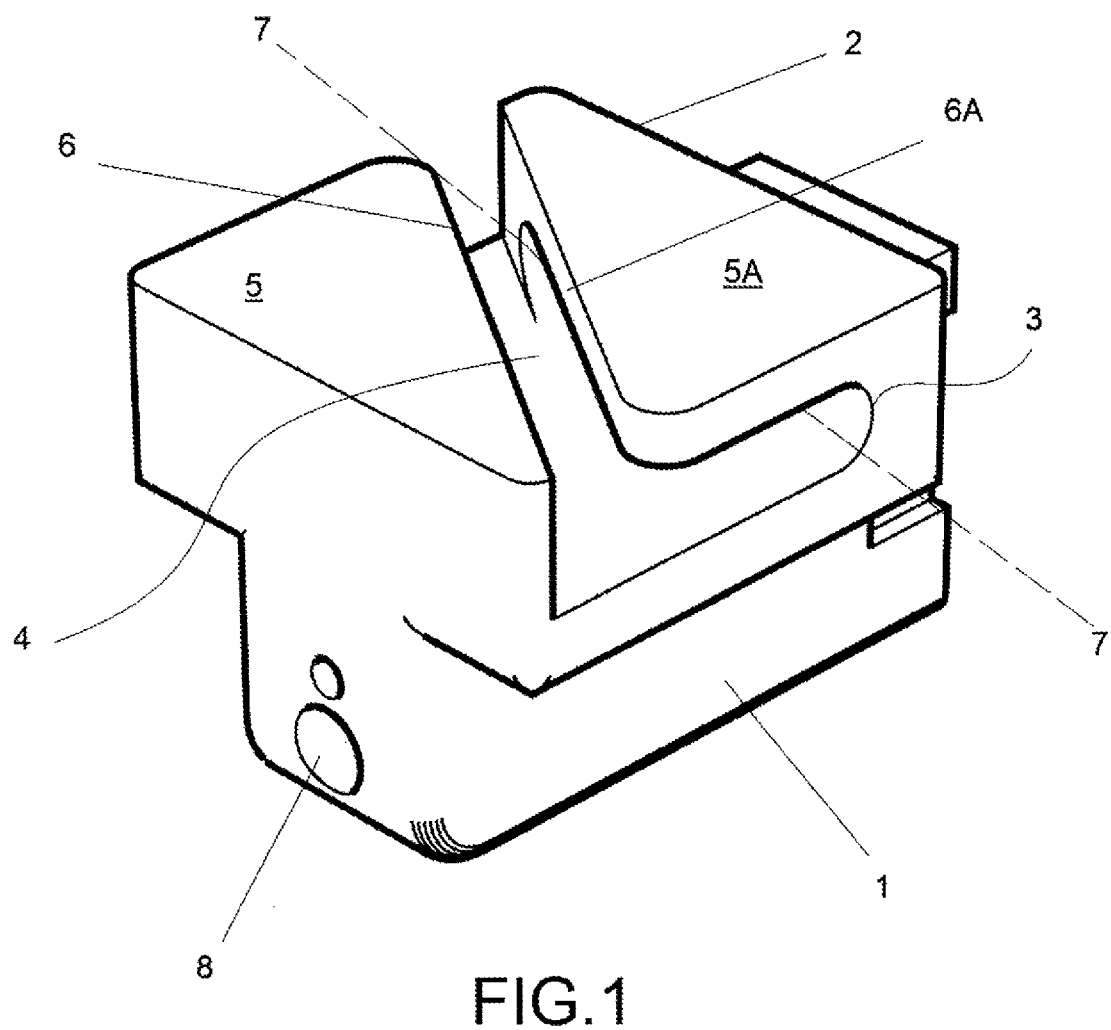
FIG. 1 shows a first embodiment of the device of the invention.
Figure 2:
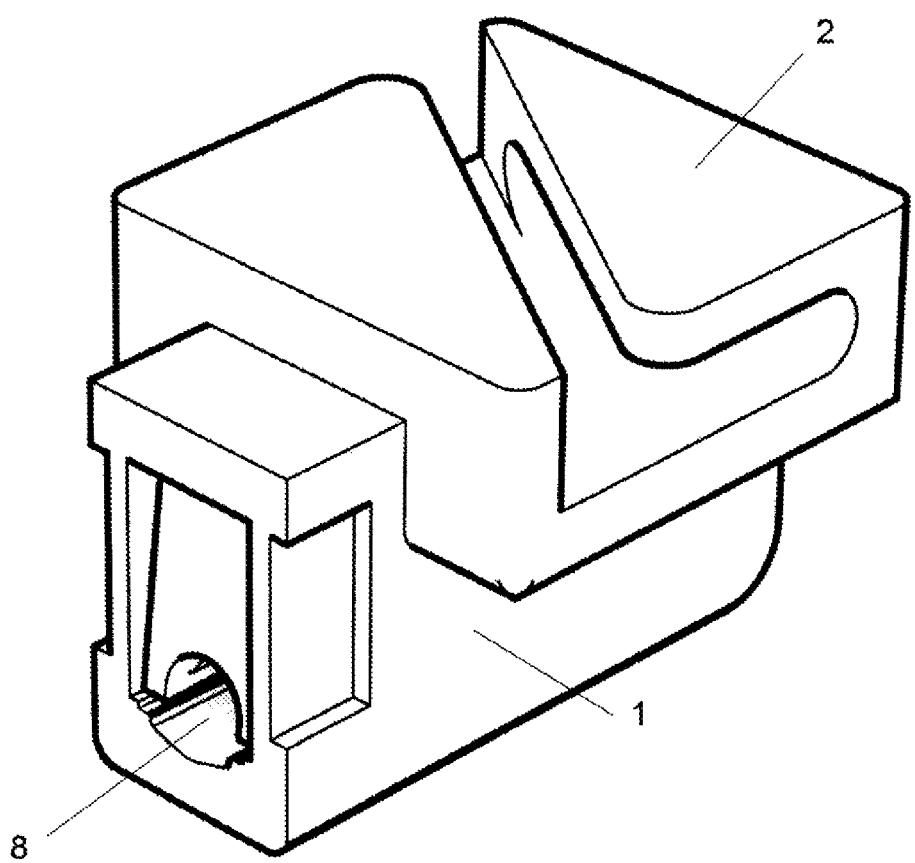
FIG. 2 shows a second view of the device of FIG. 1.
Figure 3:
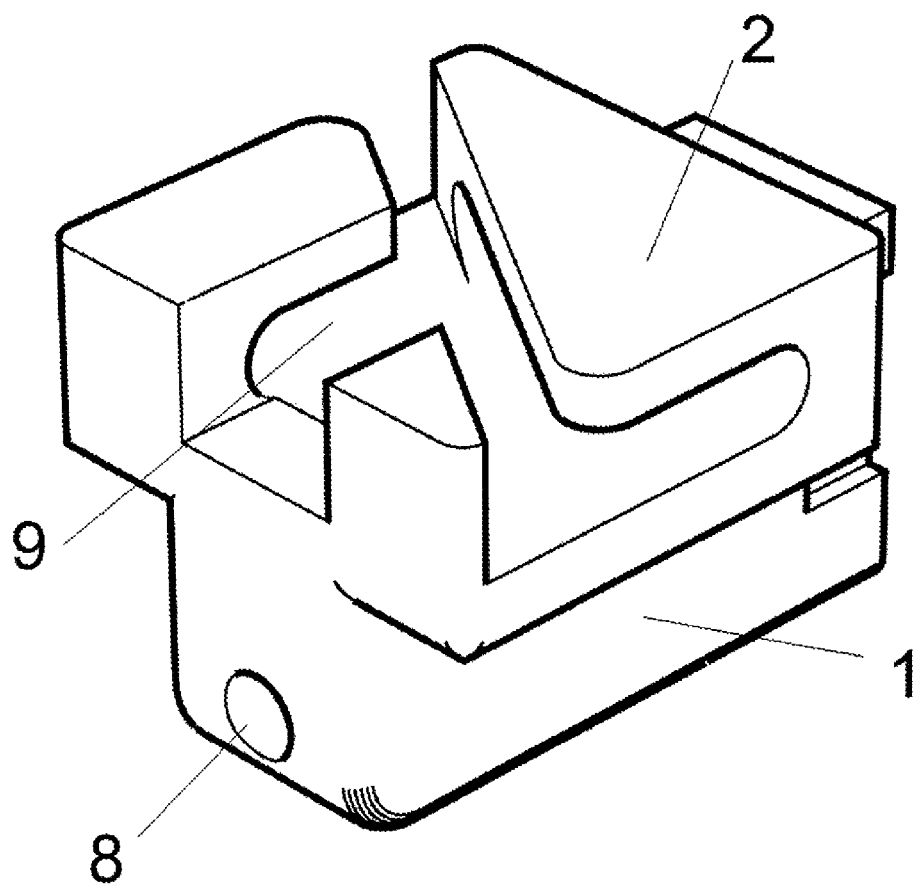
FIG. 3 shows a second embodiment of the device of the invention.
Figure 4:
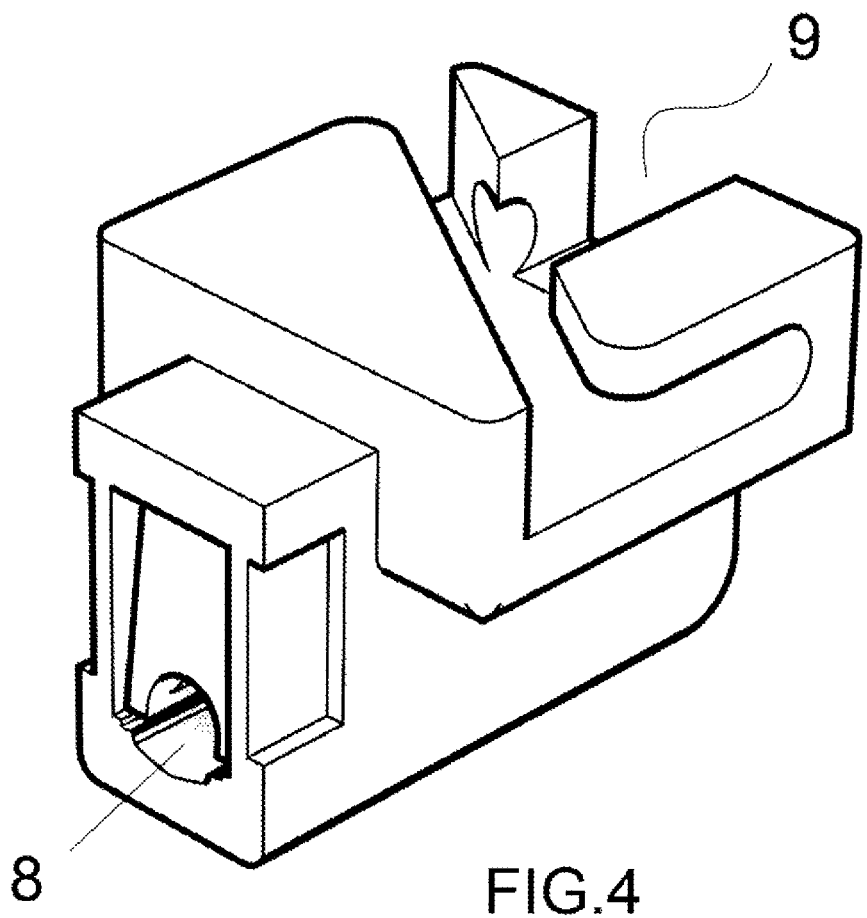
FIG. 4 shows a second view of the device of FIG. 3.
Figure 5:
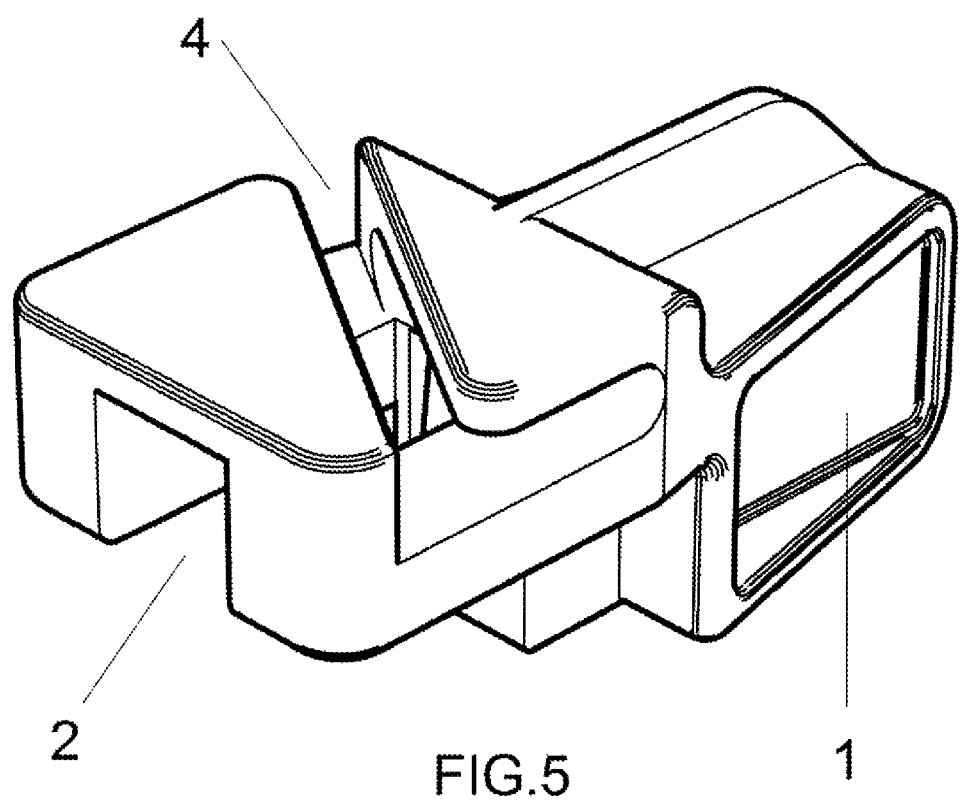
FIG. 5 shows a third embodiment of the device of the invention.
Figure 6:
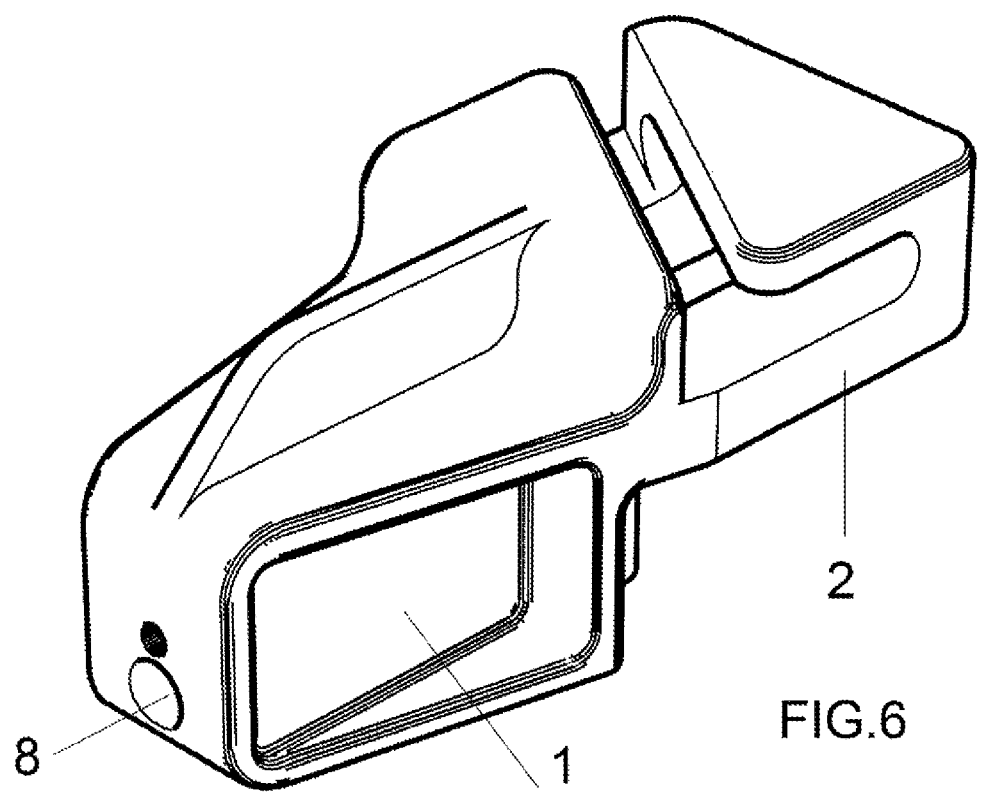
FIG. 6 shows a second view of the device of FIG. 5.
Figure 7:
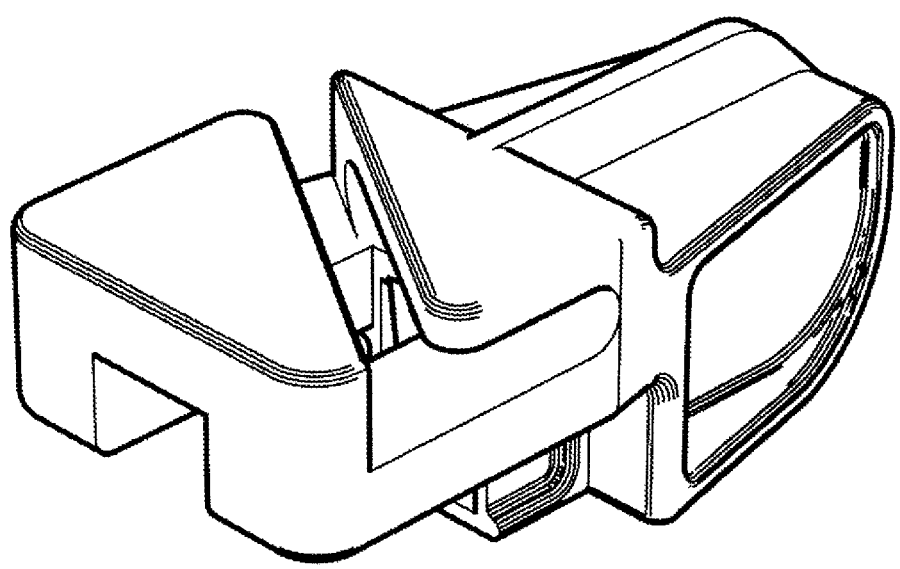
FIG. 7 shows a fourth embodiment of the device of the invention.
Figure 8:
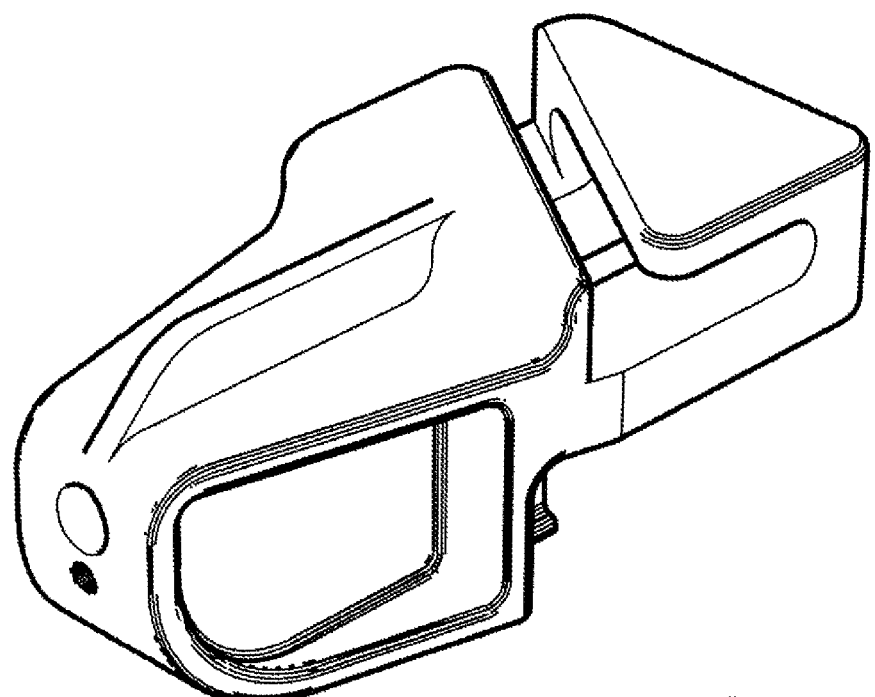
FIG. 8 shows a second view of the device of FIG. 7.
Figure 9:
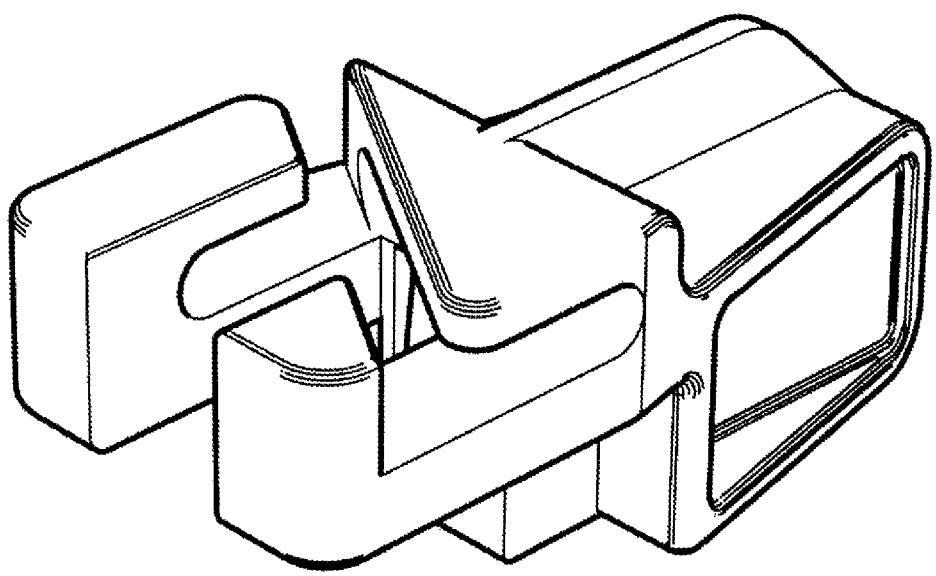
FIG. 9 shows a fifth embodiment of the device of the invention.
Figure 10:
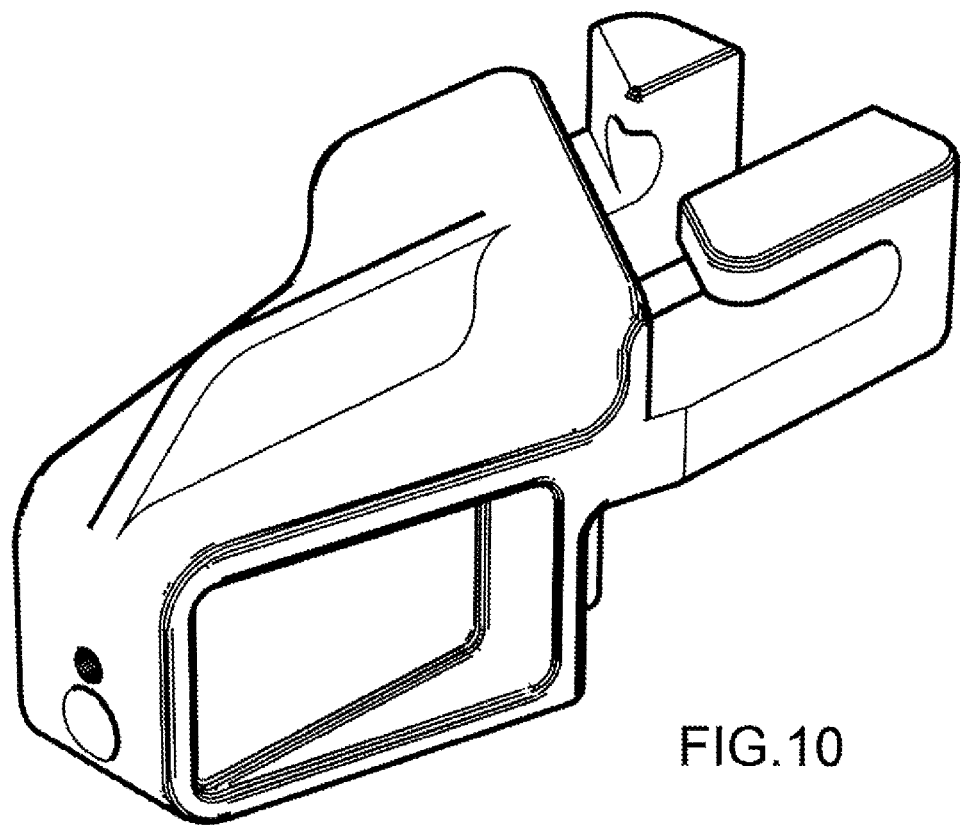
FIG. 10 shows a second view of the device of FIG. 9.
Figure 11:
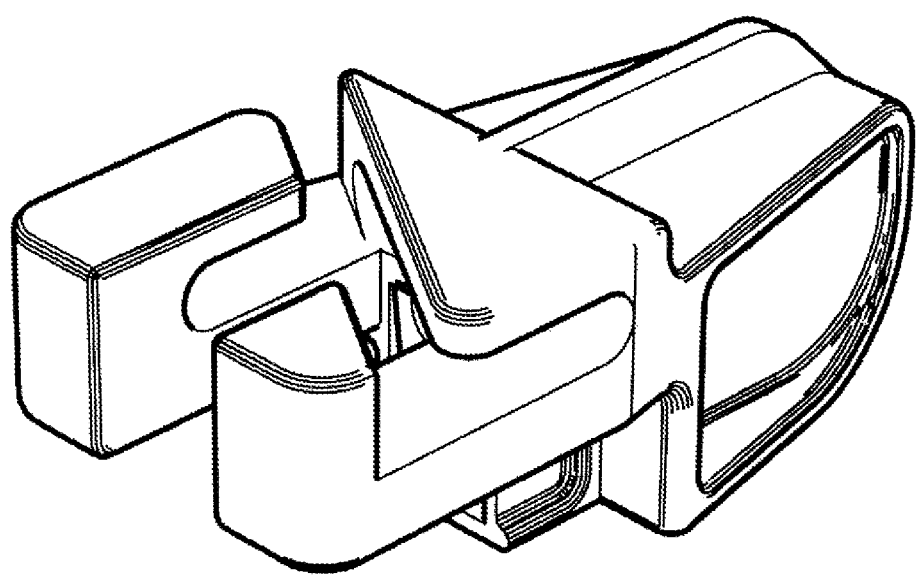
FIG. 11 shows a sixth embodiment of the device of the invention.
Figure 12:
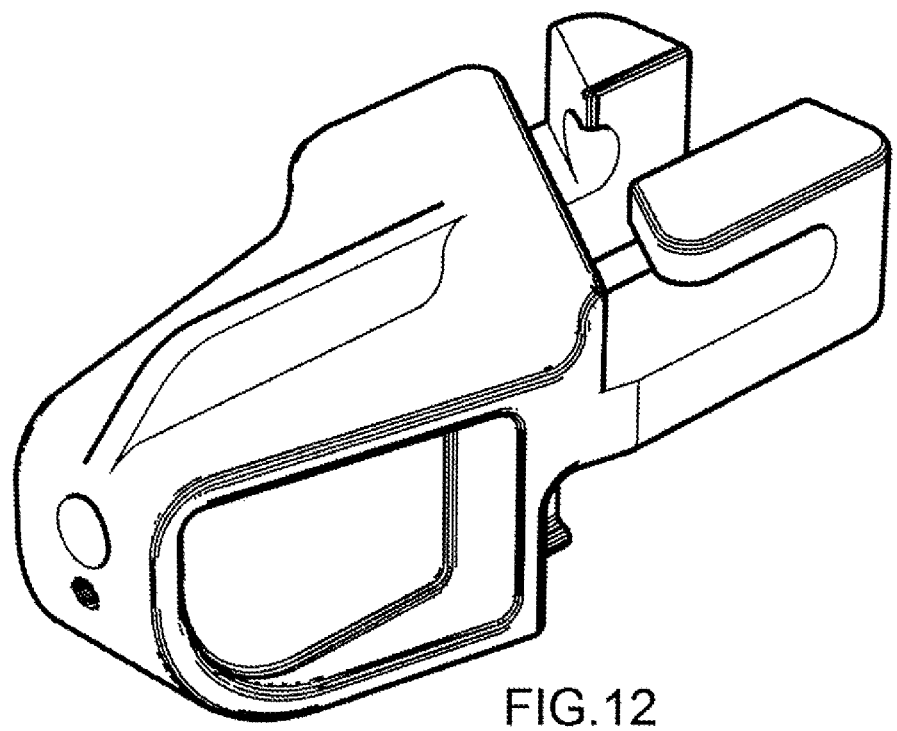
FIG. 12 shows a second view of the device of FIG. 11.
Figure 13:
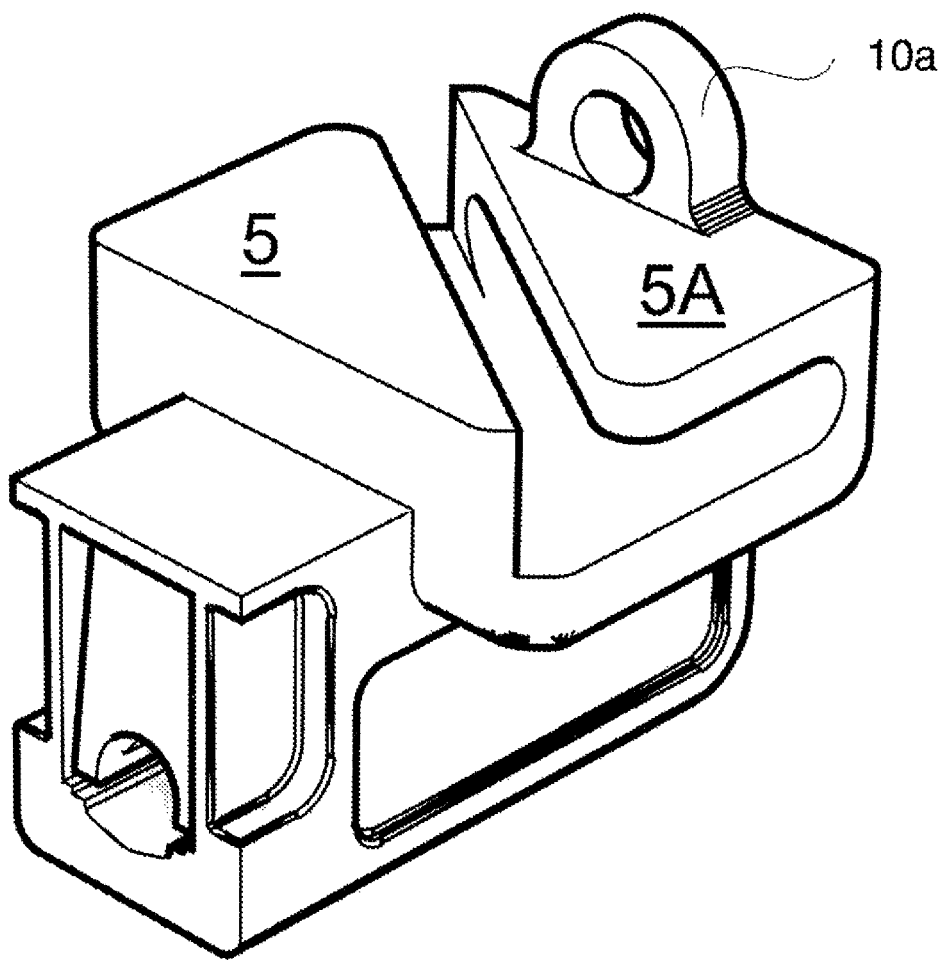
FIG. 13 shows a seventh embodiment of the device of the invention.
Figure 14:
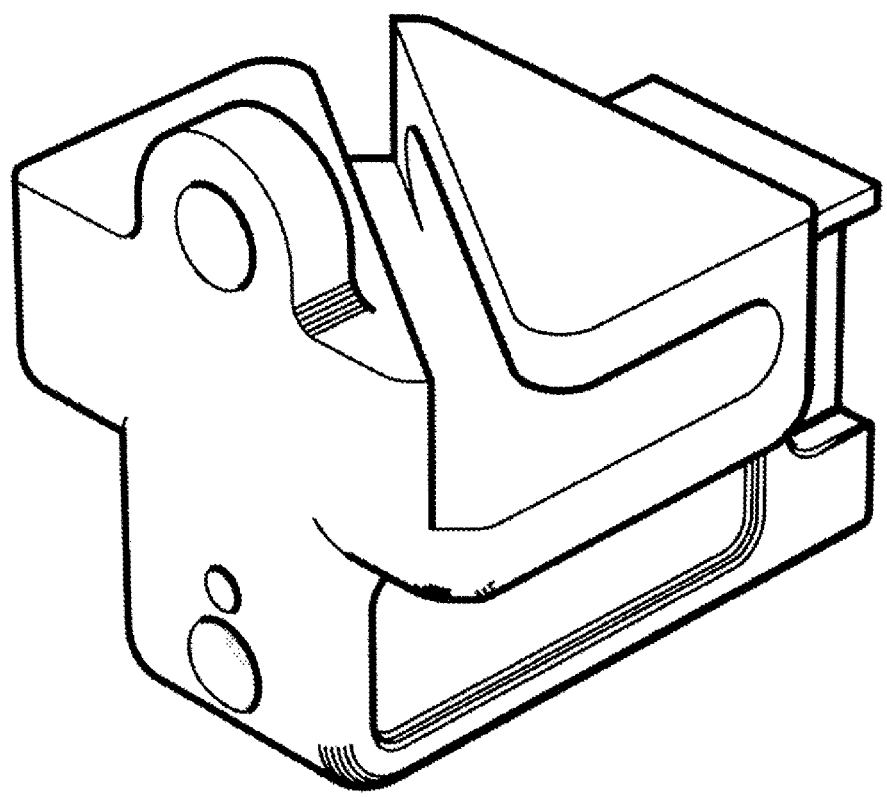
FIG. 14 shows a second view of the device of FIG. 13.
Figure 15:
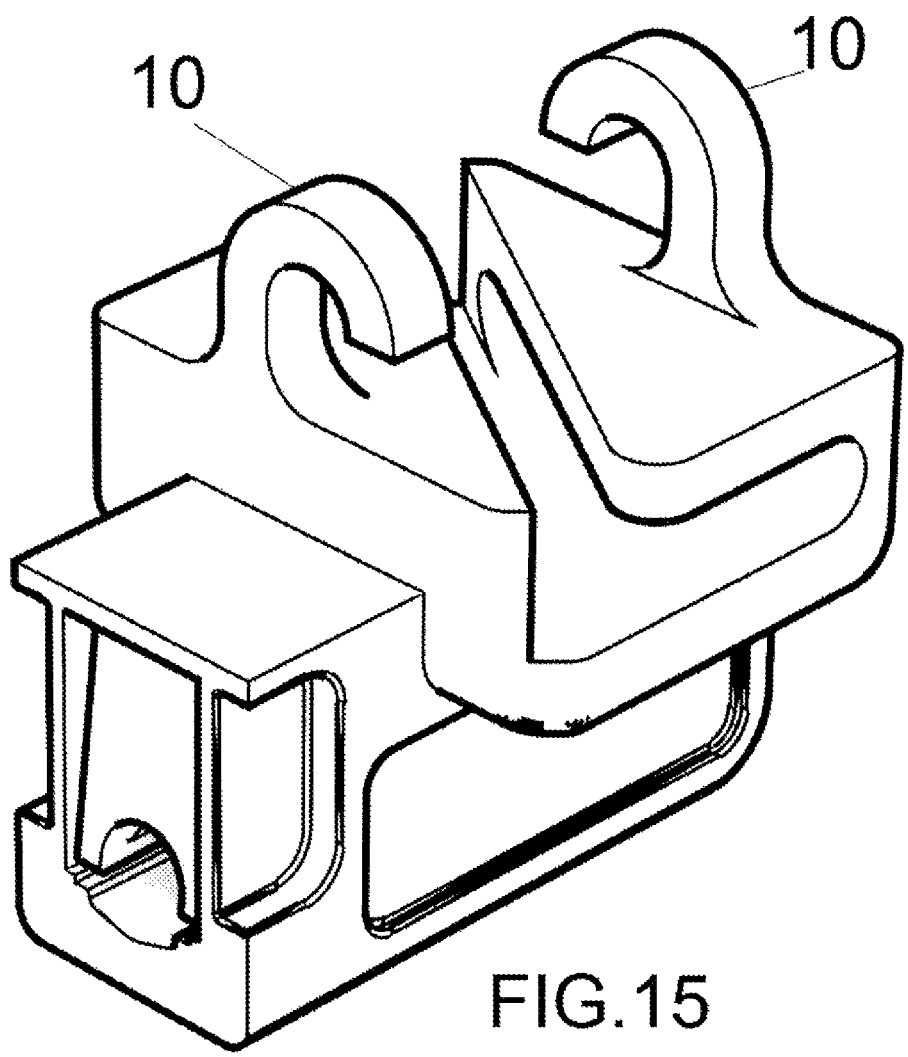
FIG. 15 shows an eighth embodiment of the device of the invention.
Figure 16:
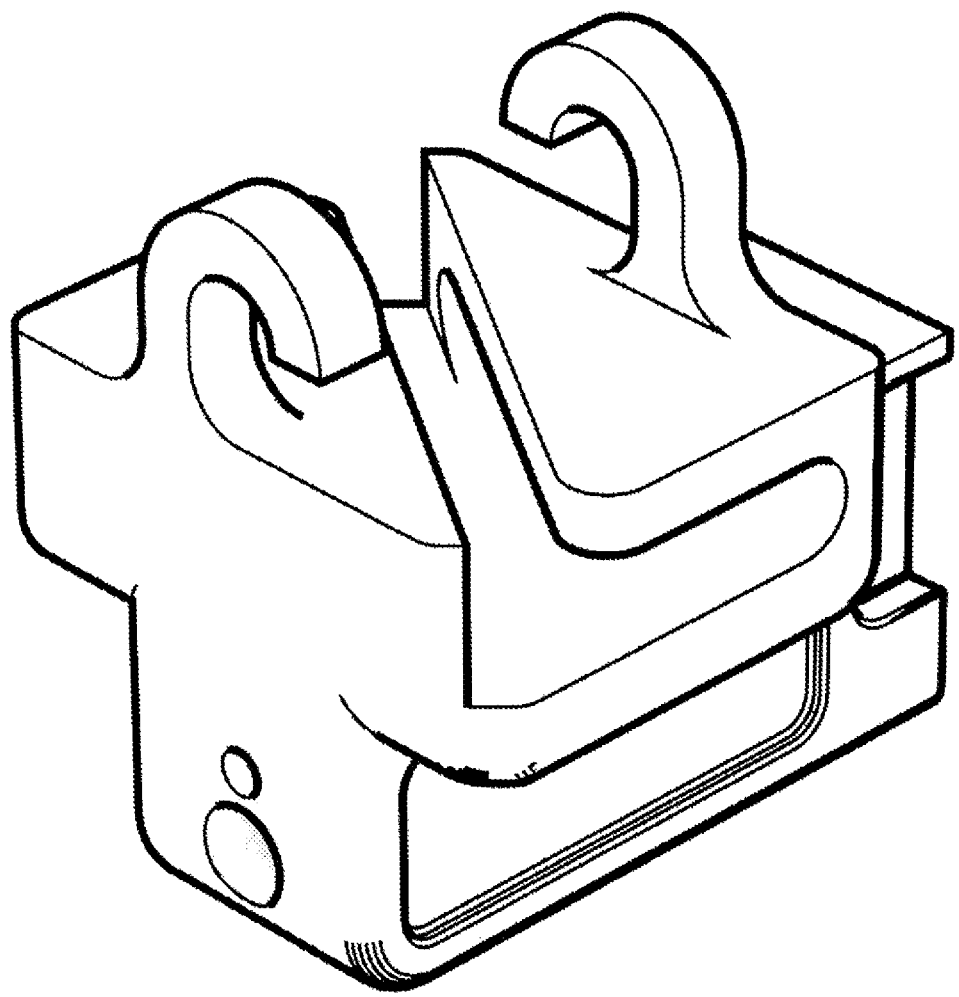
FIG. 16 shows a second view of the device of FIG. 15.
Figure 17:
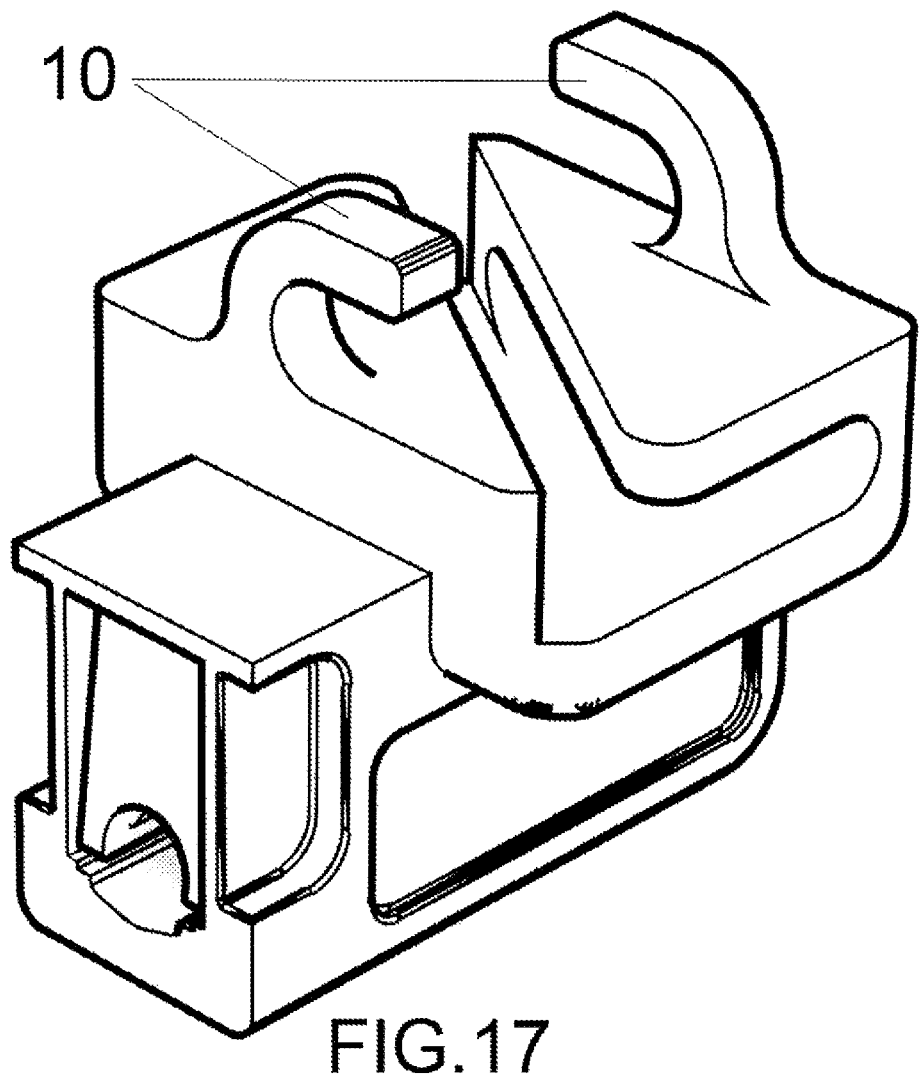
FIG. 17 shows a ninth embodiment of the device of the invention.
Figure 18:
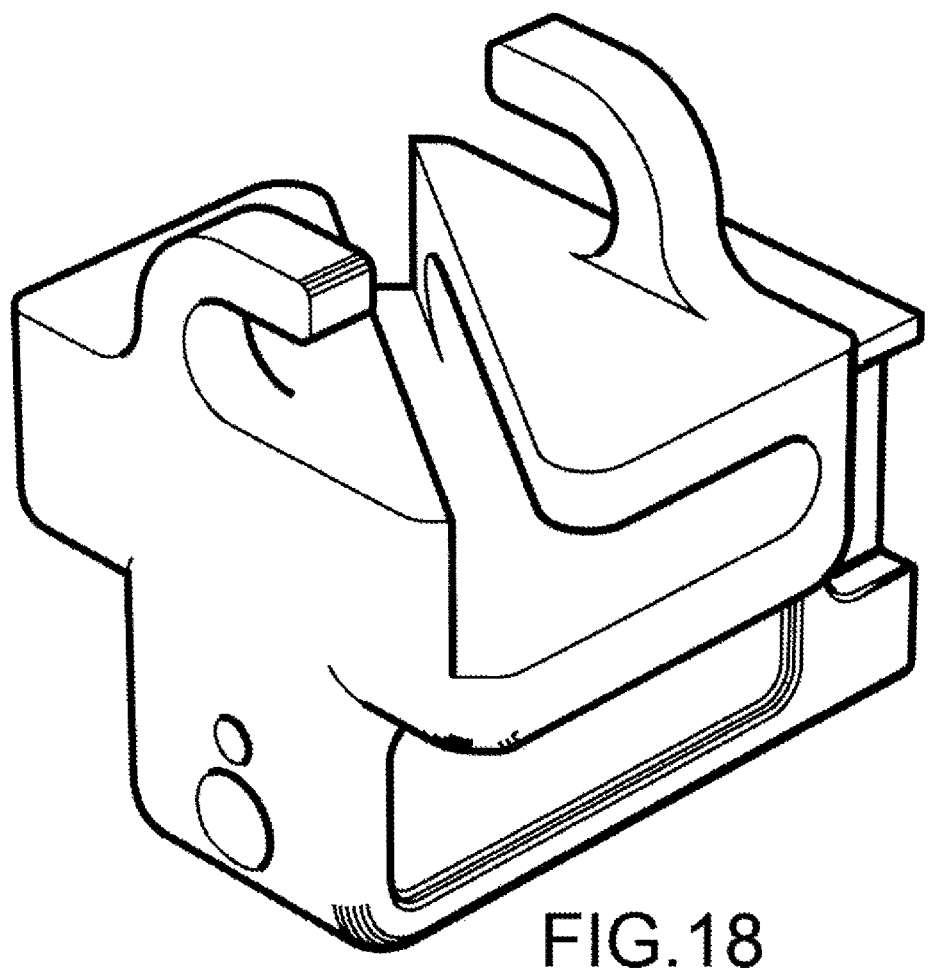
FIG. 18 shows a second view of the device of FIG. 17.
Figure 19:
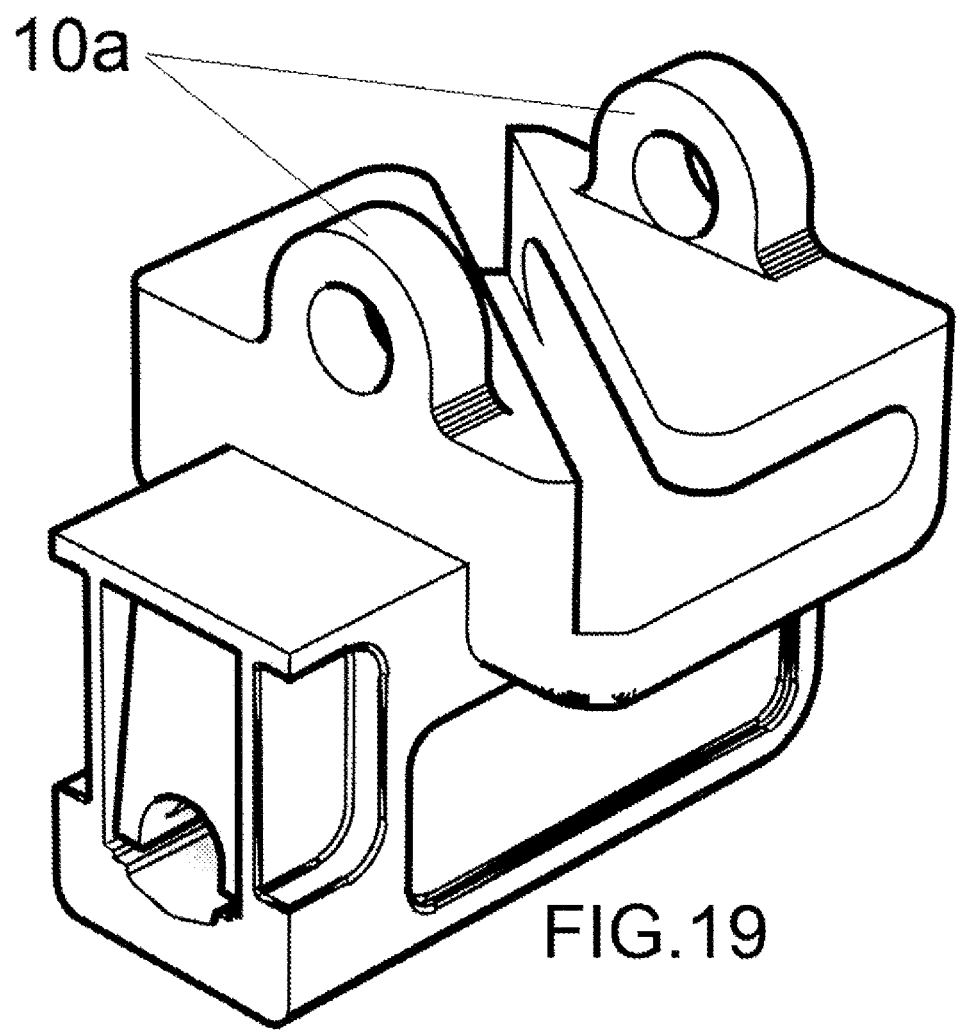
FIG. 19 shows a tenth embodiment of the device of the invention.
Figure 20:
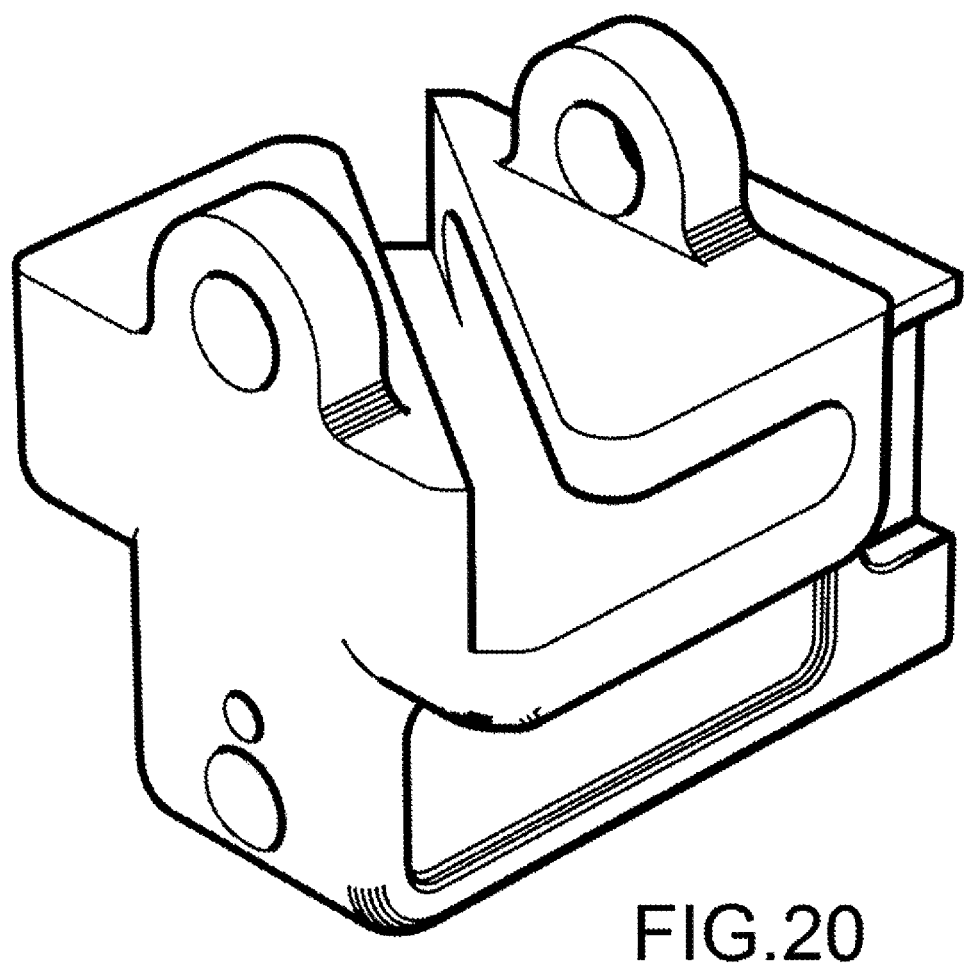
FIG. 20 shows a second view of the device of FIG. 19.
Figure 21:
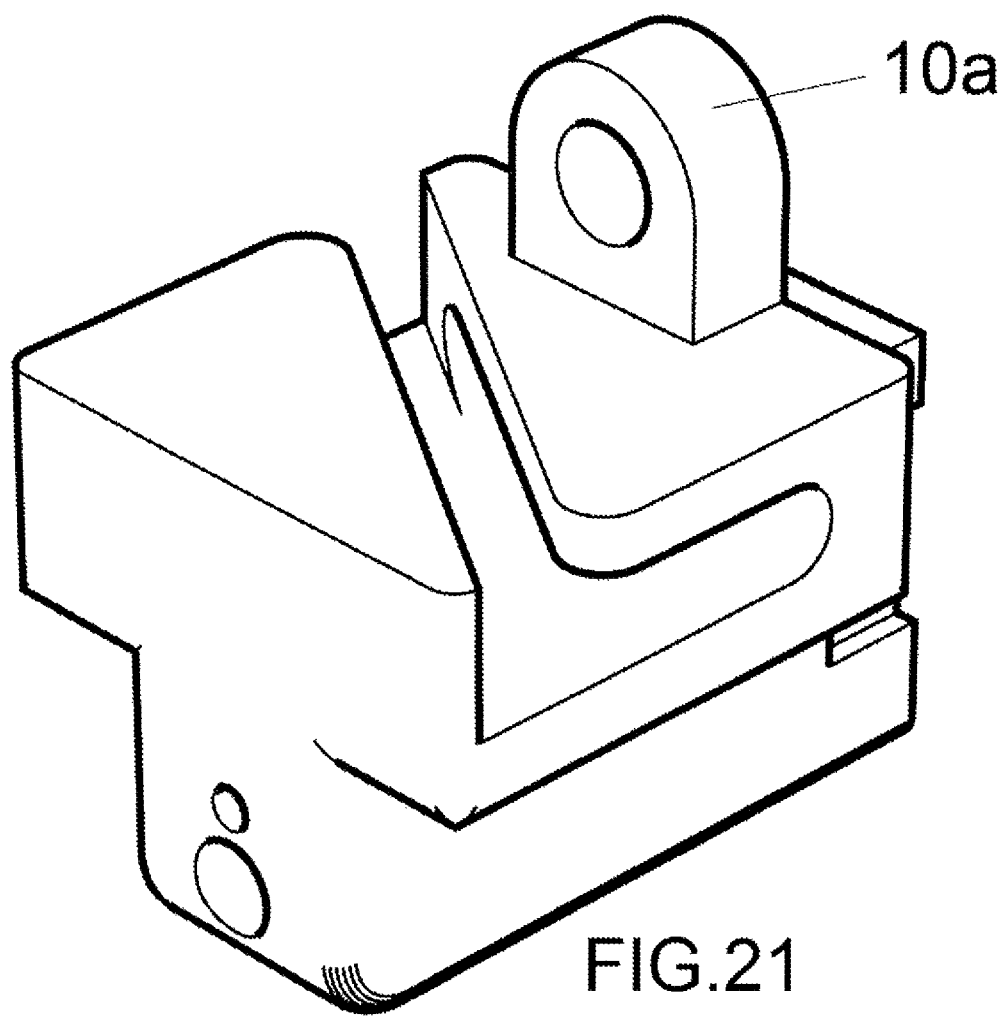
FIG. 21 shows an eleventh embodiment of the device of the invention.
Figure 22:
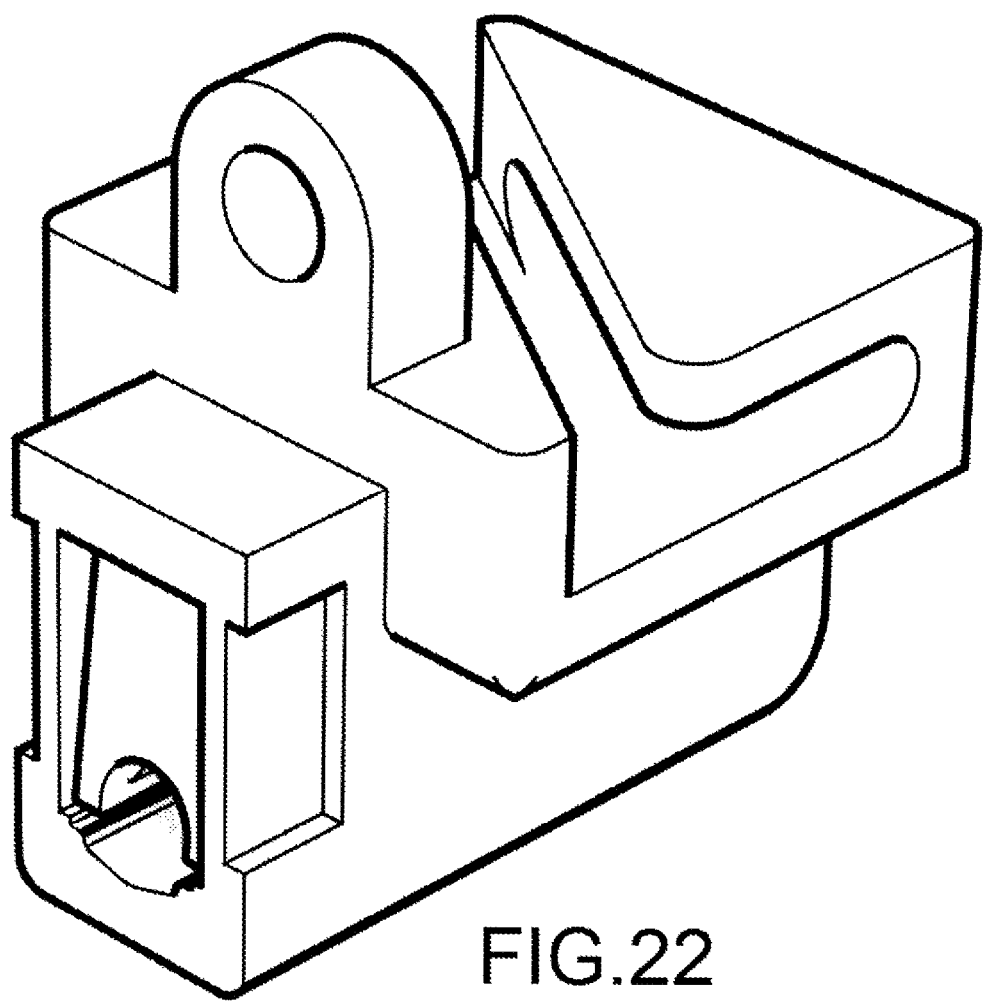
FIG. 22 shows a second view of the device of FIG. 21.
Figure 23:
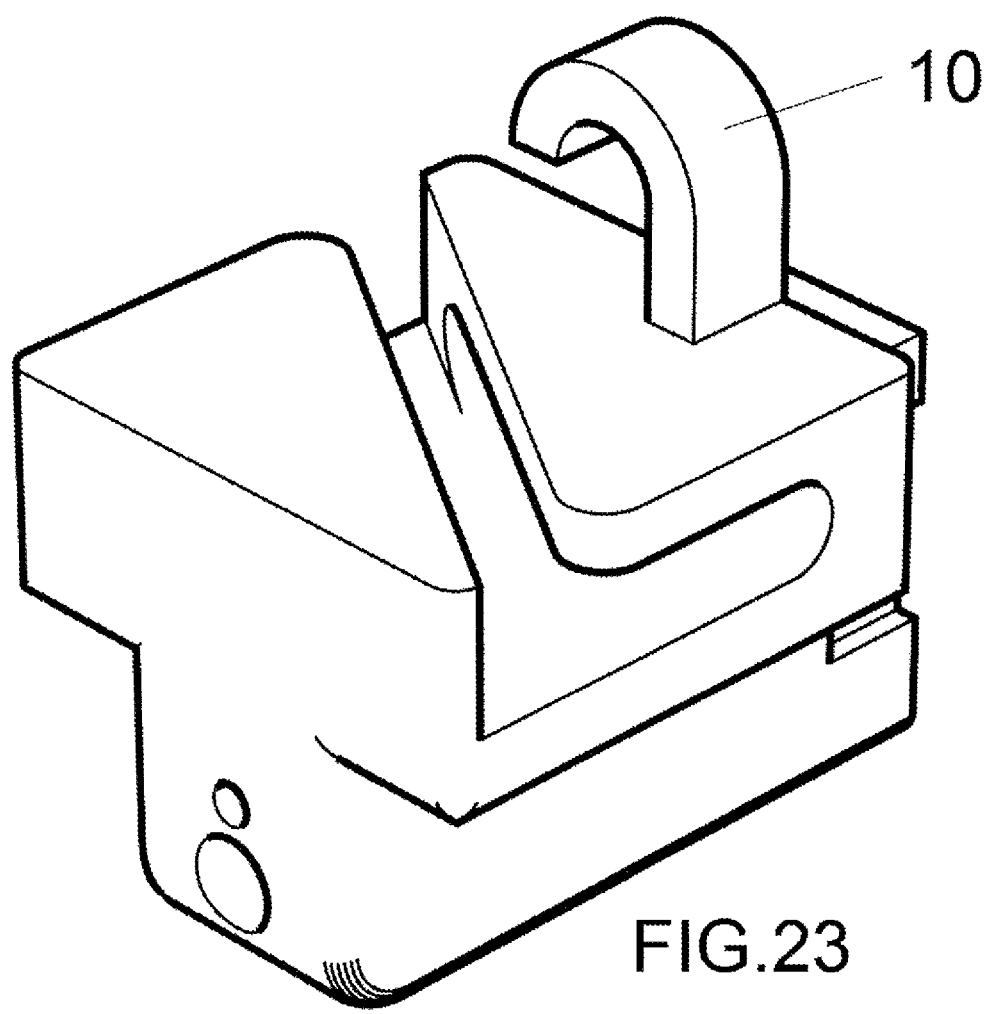
FIG. 23 shows a twelfth embodiment of the device of the invention.
Figure 24:
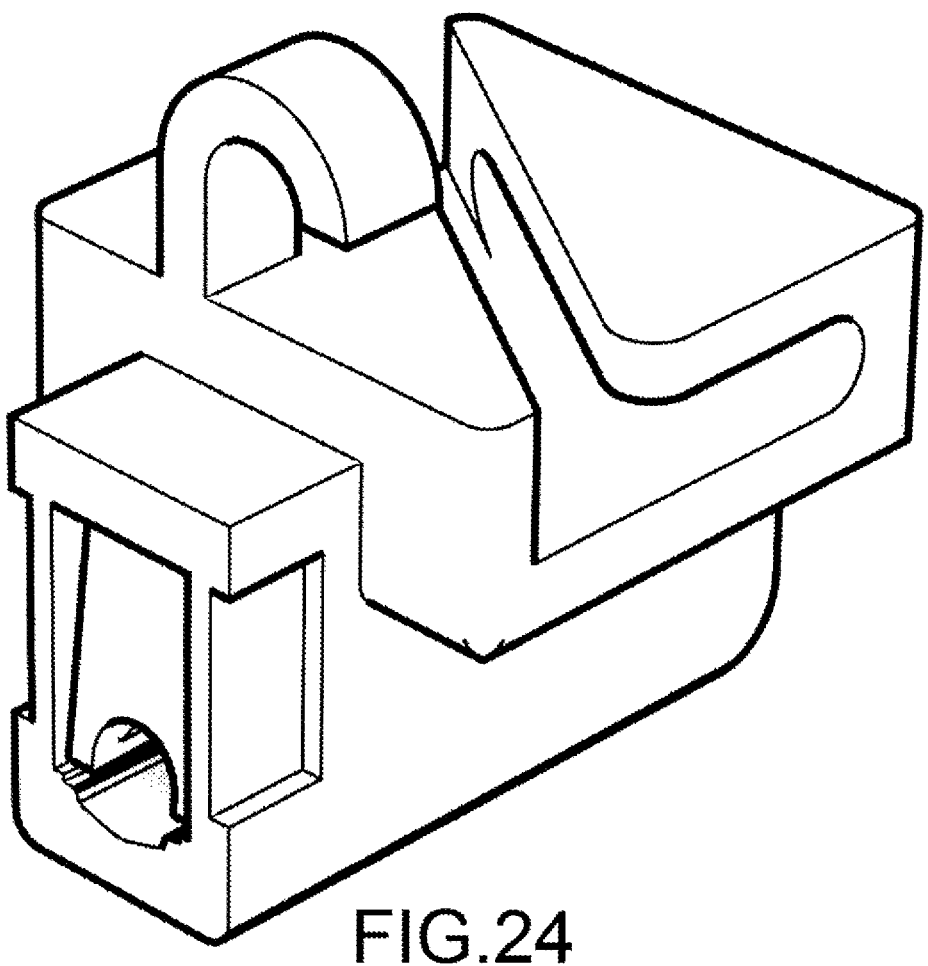
FIG. 24 shows a second view of the device of FIG. 23.
Figure 25:
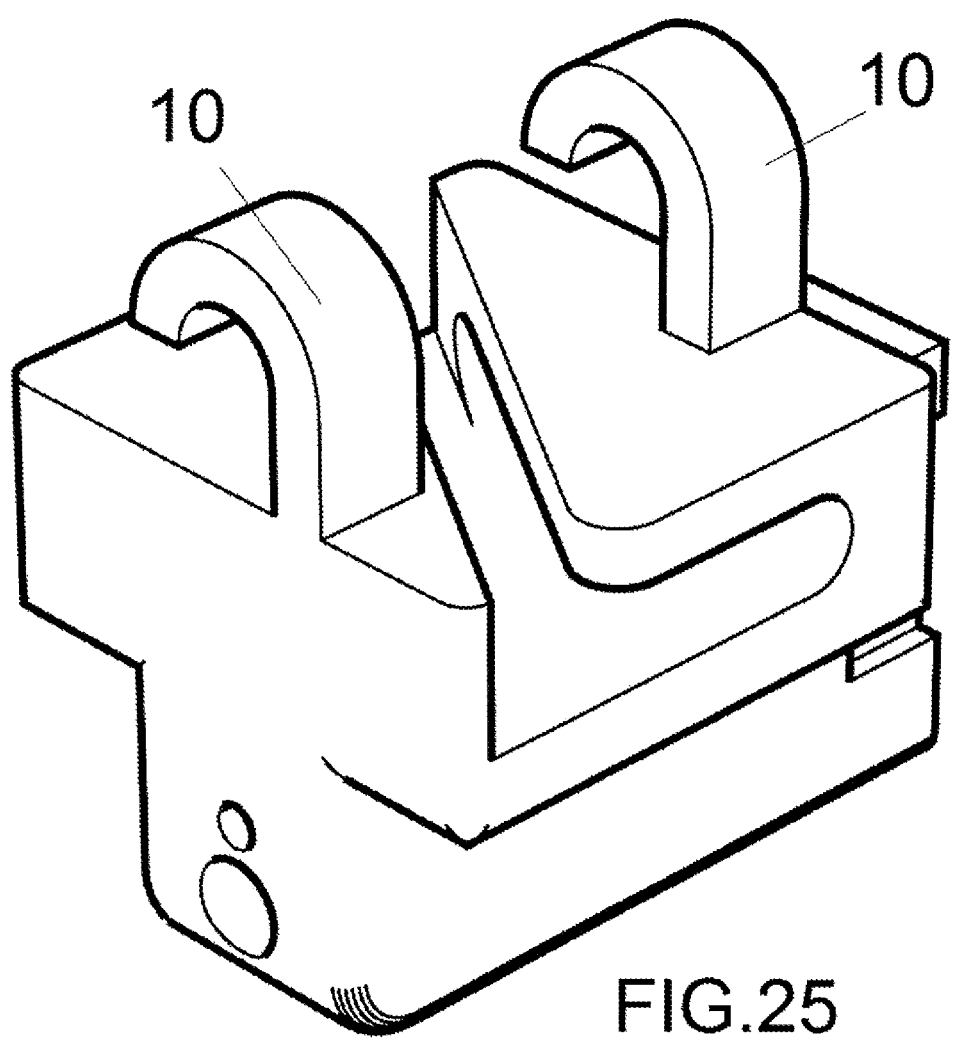
FIG. 25 shows a thirteenth embodiment of the device of the invention.
Figure 26:
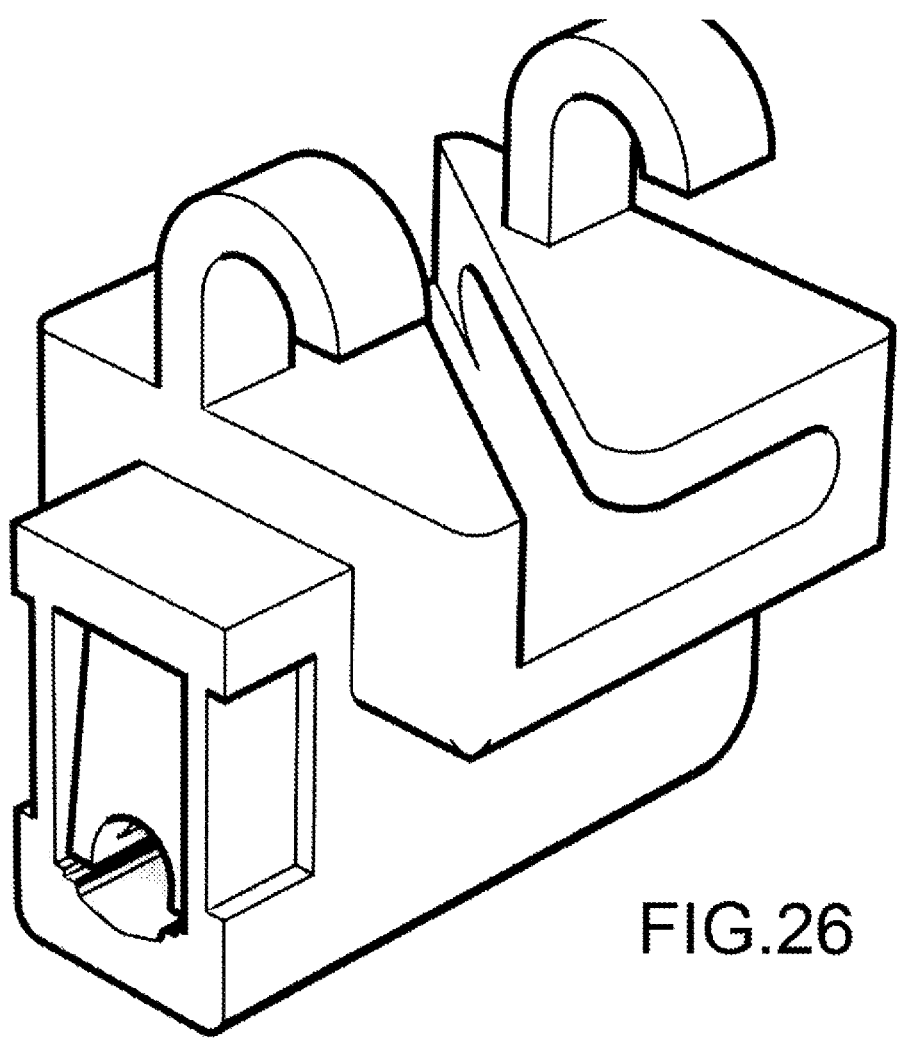
FIG. 26 shows a second view of the device of FIG. 25.
Figure 27:
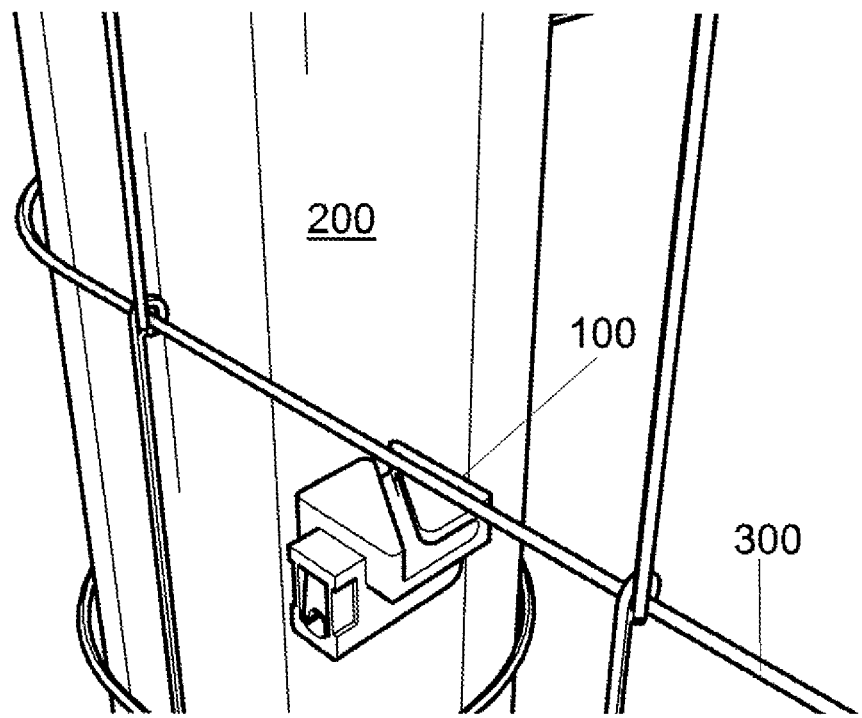
FIGS. 27 to 33 show a sequence for assembling the device of the invention shown in FIGS. 1 and 2.
Figure 28:
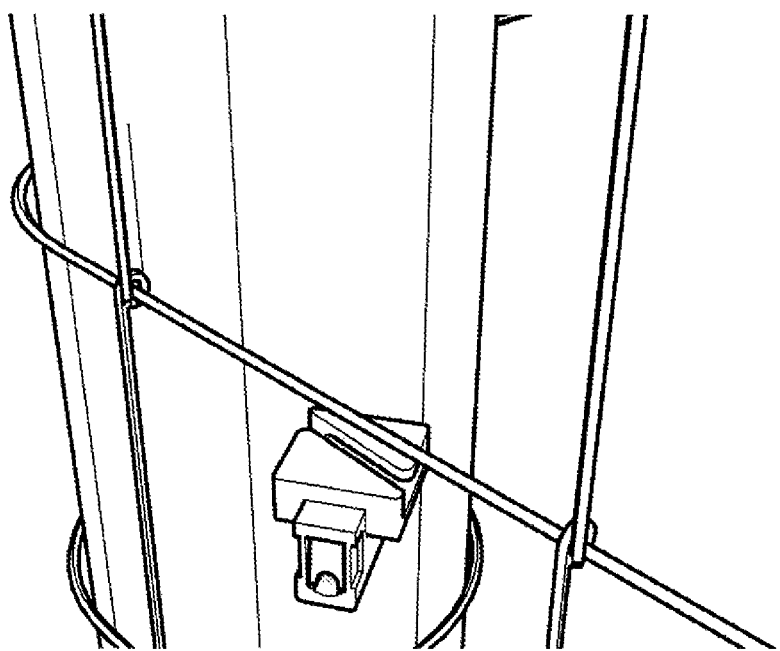
Figure 29:
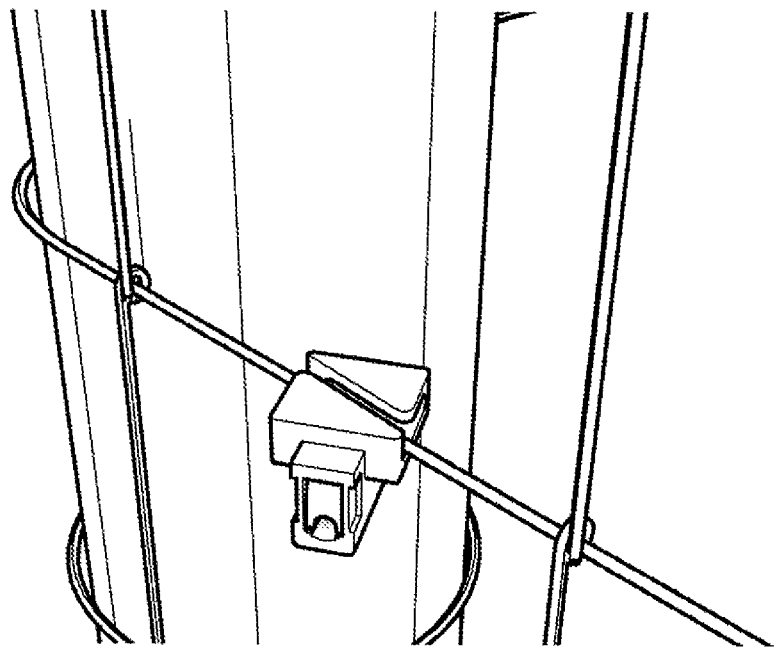
Figure 30:
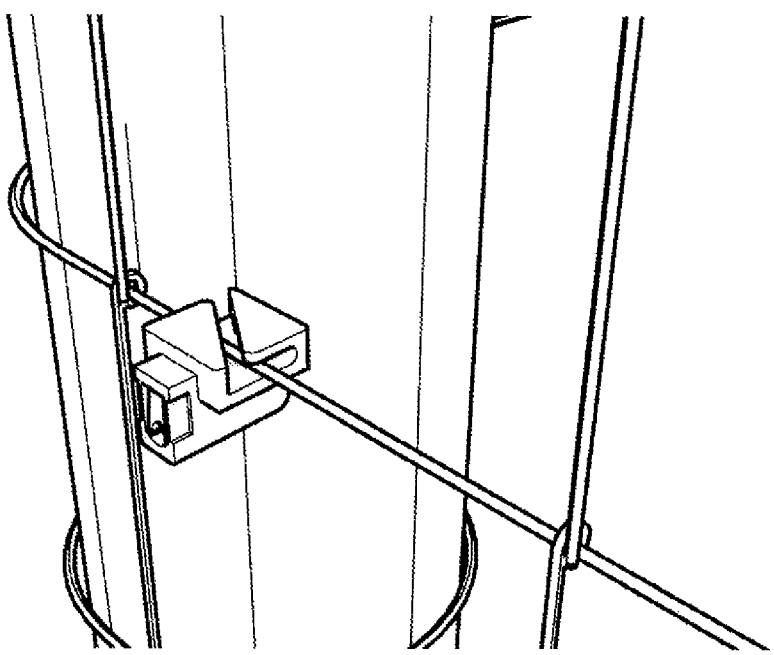

As shown in the attached drawings, there are up to 15 embodiments which differ from one another in certain constructive details as indicated below.

In a first embodiment as can be seen in FIGS. 1 to 26, the wire terminator device 100 comprises two different parts or bodies: a first body 1 housing a wire retention mechanism such as the one described in ES 2 284 365 and a second body 2 comprising engagement means where a cable or wire is retained in the usage position.

The engagement means forming the second body 2 are in the form of an engagement element defined by a through passage 3 in the direction of passage 7 of the wire. This direction of passage 7 of the wire is defined by an arrow indicating the sense thereof. There is not defined in the through passage any retention element, with the particularity of comprising a single inlet groove 4 which is oblique with respect to the direction of passage 7 of the wire or cable; and wherein said single inlet groove 4 is arranged in the same plane of passage of the wire or cable.

The inlet groove 4 to the through passage 3, due precisely to the inlet groove 4 being oblique with respect to the direction of passage 7 of the wire or cable, comprises two regions (5, 5a) opposite one another and the inner edges (6, 6a) of which are parallel and separated by a distance (d) greater than the diameter of the wire or cable 300.

As a result of this structure, the cable is introduced through the inlet groove 4 to transition from the inclined position or entry position of the cable or wire 300 to the usage position or non-inclined position of the cable or wire 300, said cable 300 thereby being retained in the second body 2 and housed in the engagement means (3, 4, 5, 5a, 6, 6a) defined therein.

Finally, once the wire 300 is housed and retained in the second body 2, said wire 300 will surround a support element, such as a post 200, for being fixed in the retention element housed in the first body 1 through a through hole 8 transverse to first and second bodies (1, 2). This transverse through hole 8 is separated from the portion or part of the cable or wire 300 arranged in the engagement means of the second body 2. This arrangement prevents moisture from condensing between the portions of the cable or wire 300 due to outdoor air flow, and therefore reduces the corrosion effect in the retention elements.

The embodiments shown in FIGS. 3, 4, 9, 10, 11, and 12 comprise, in addition to that indicated for the assembly of the embodiments, a transverse notch 9 with respect to the inlet groove 4 of the second body 2. Although it complicates the manufacturing process, this embodiment also achieves cost savings because a lower amount of material is required. In fact, the introduction of the transverse notch seeks to reduce the weight of the assembly, and therefore lower product cost, but it has no major influence on the overall operation of the device.

Moreover, the embodiments of FIGS. 1 to 4 show a compact device in which the second body 2 is arranged on the first body 1, whereas the embodiments shown in FIGS. 5 to 12 show a device in which, despite having the second body 2 arranged on the first body 1, said first body 1 and second body 2 are both shifted, i.e., not vertically aligned. The main advantage of the embodiments shown in FIGS. 1 to 4 (and likewise in FIGS. 13 to 30) is that, with this more compact arrangement, the assembly of the retention elements in the first body 1 is facilitated as they do not interfere with the position of the second body 2 during the operation of assembling said elements. That is due to fact that, as seen in the drawings, in the case of FIGS. 1 to 4 and 13 to 26, the locking elements are assembled on the same side as the engagement element of the second body 2, whereas in FIGS. 5 to 12, the retention elements are located on the side opposite the engagement element of the second body 2.

Furthermore, as can be seen in the embodiments of FIGS. 13 to 26, there are arranged on the opposite regions (5, 5a) of the second body 2 second engagement elements 10 or lugs 10a which are intended, as best seen in FIGS. 34 to 44, for providing a second anchoring (10, 10a) for the cable 300 during usage.

Therefore, as a result of this structure the assembly of the wire terminator device (1) is simplified, as best seen in FIGS. 31 to 37. In fact and by way of example, the device has been depicted according to the first embodiment shown in FIGS. 1 and 2, although it would be applicable to any embodiment of those shown in FIGS. 1 to 12.

In a first step (FIG. 27), the terminator device 1 would be arranged close to and below the cable or wire 300, which is attached to a post 200. In a second step (FIG. 28), the device 100 is rotated with respect to its horizontal plane until the cable or wire 300 is in a position coinciding with the oblique inlet groove 4 of the device 100, with the cable 300 being introduced in said groove 4 (FIG. 29) and trapped in the through passage 3 (see FIG. 30) when the device 100 again rotates with respect to its horizontal plane.

Figure 31:
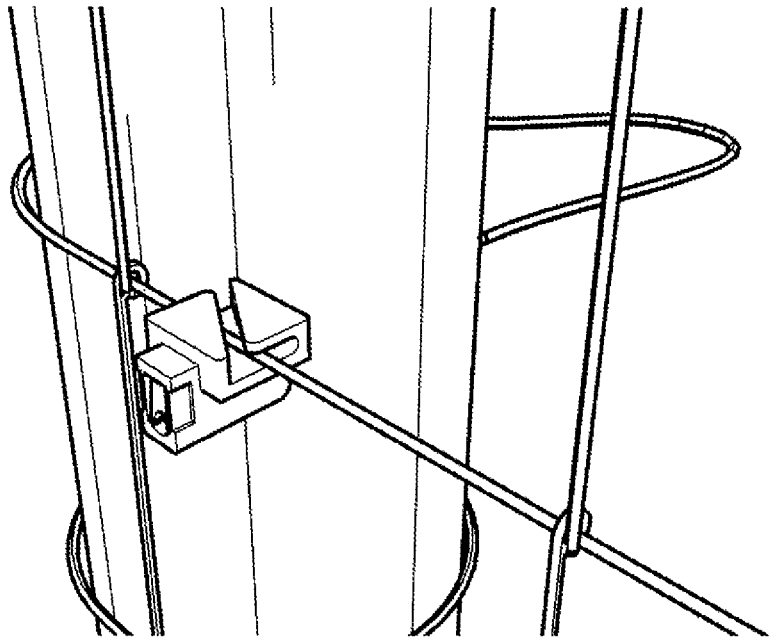
Figure 32:
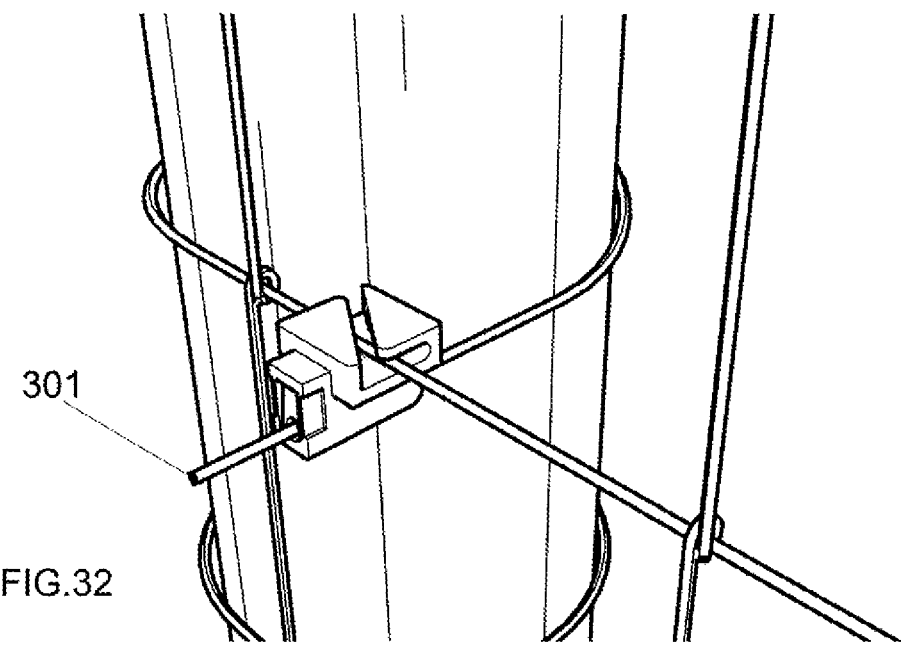
Figure 33:
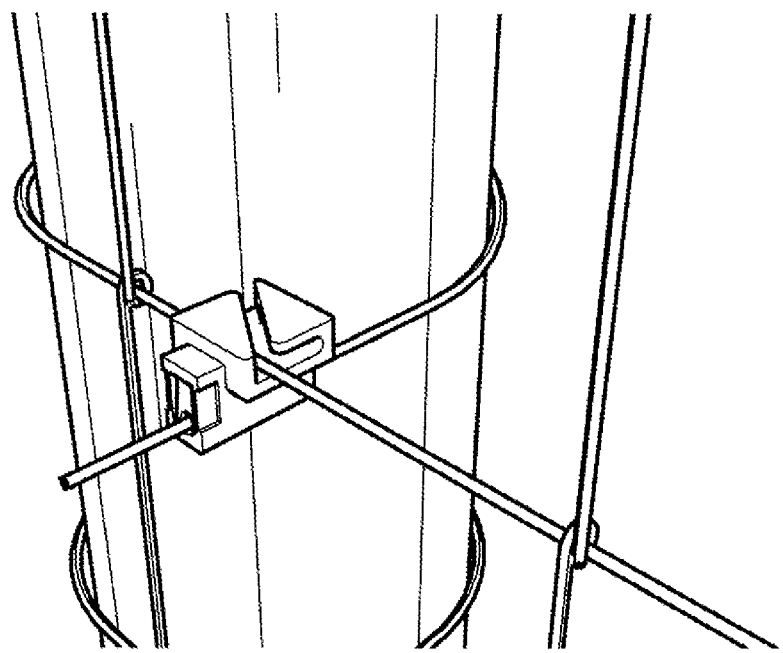
Figure 34:
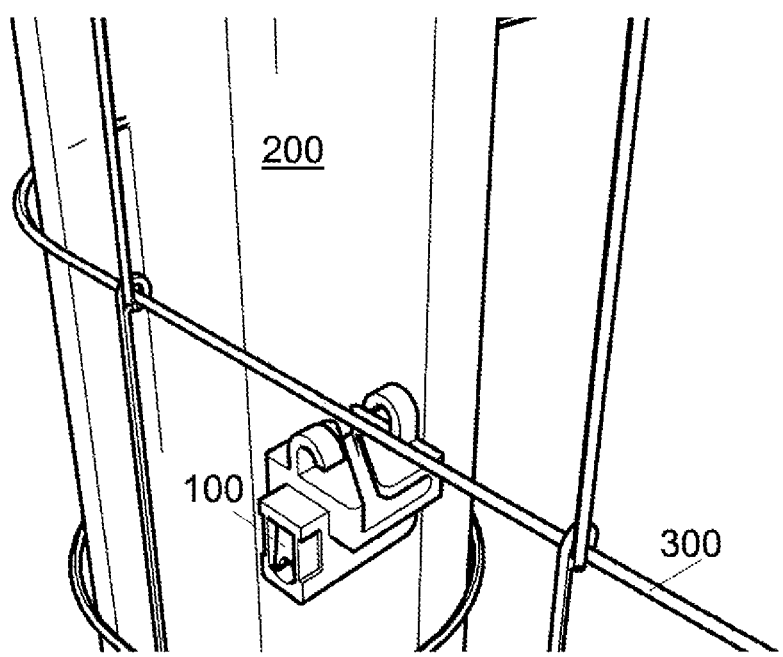
FIGS. 34 to 44 show a second sequence for assembling the device of the invention shown in FIGS. 15 and 16.
Figure 35:
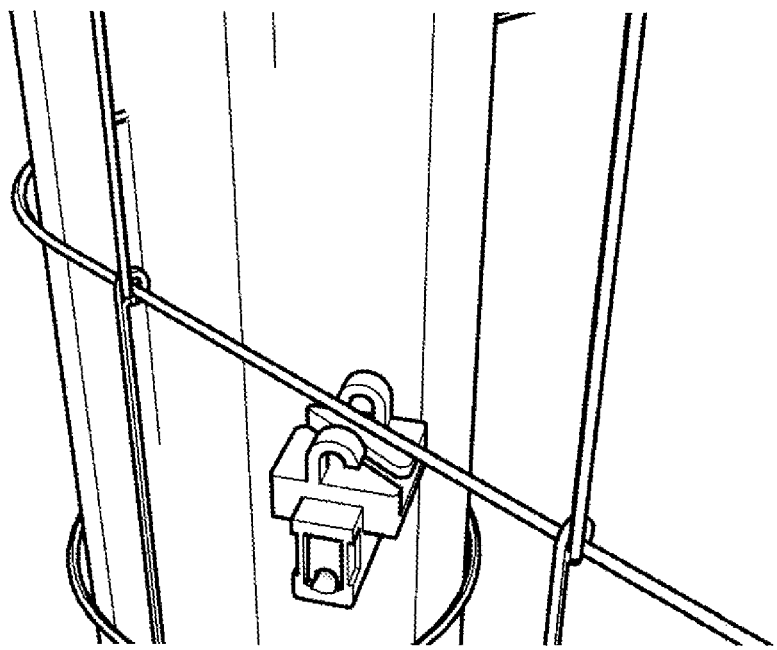
Figure 36:
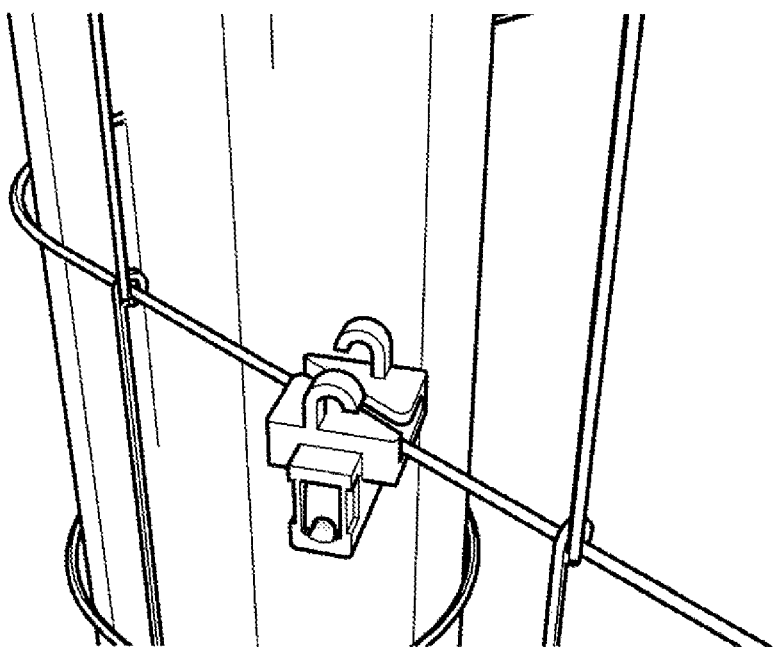
Figure 37:
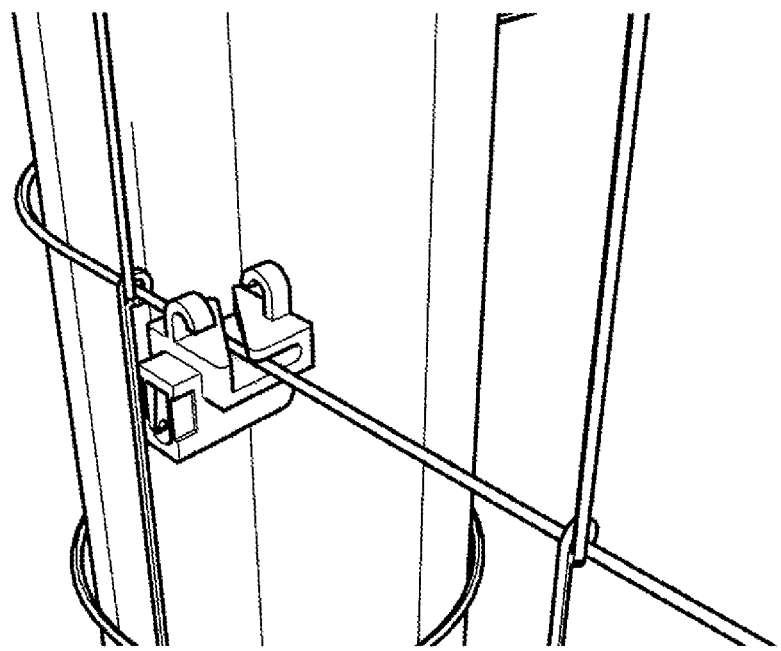
Figure 38:
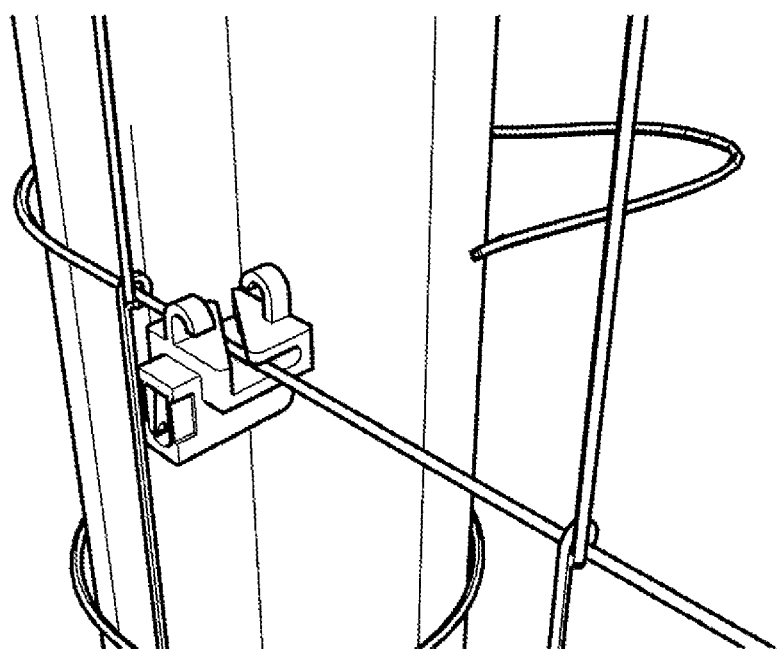
Figure 39:
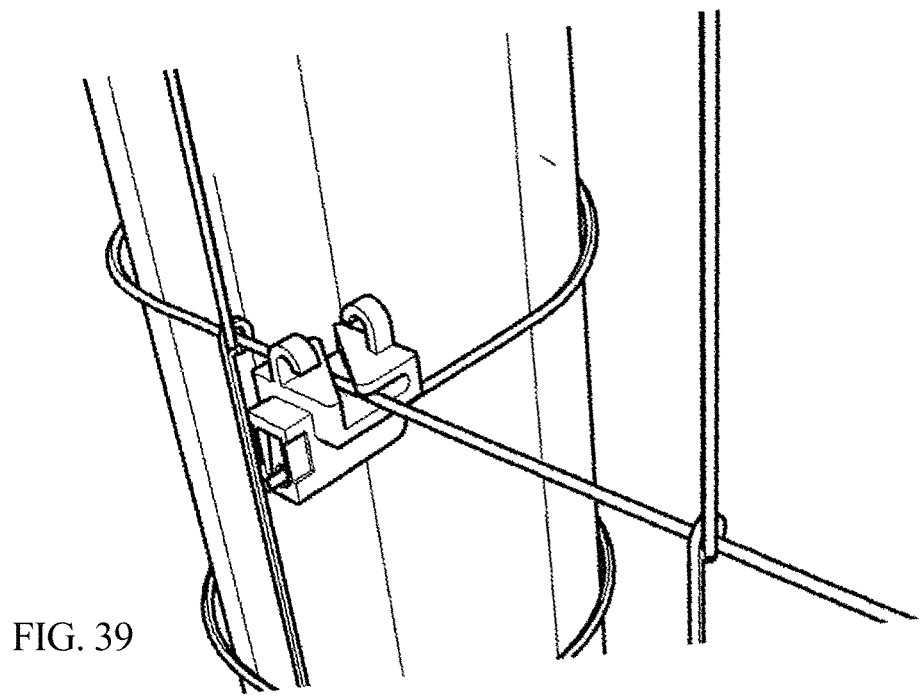
Figure 40:
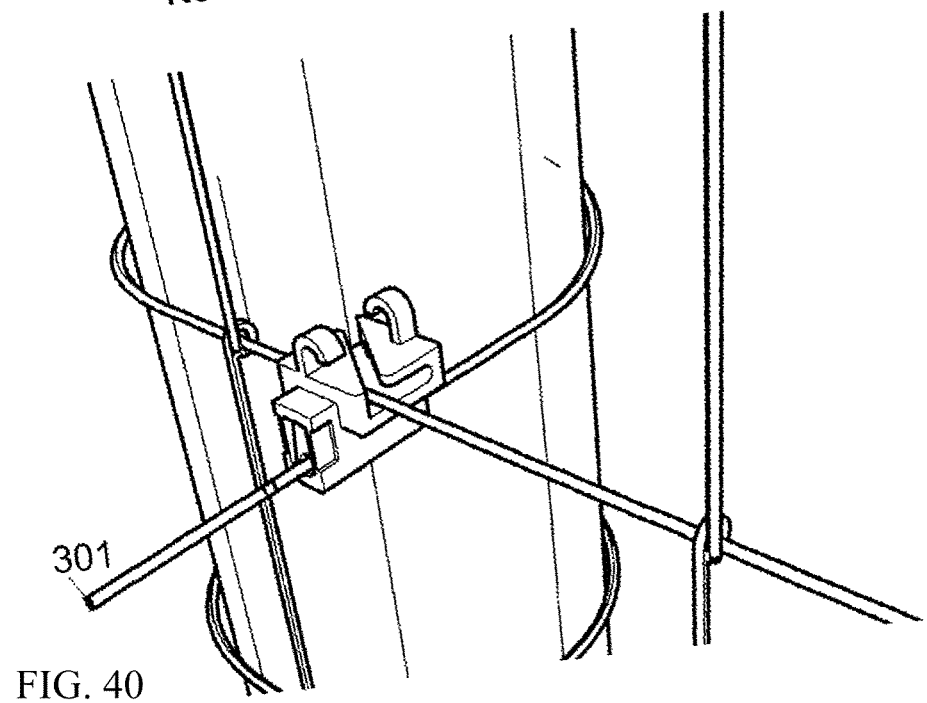
Figure 41:
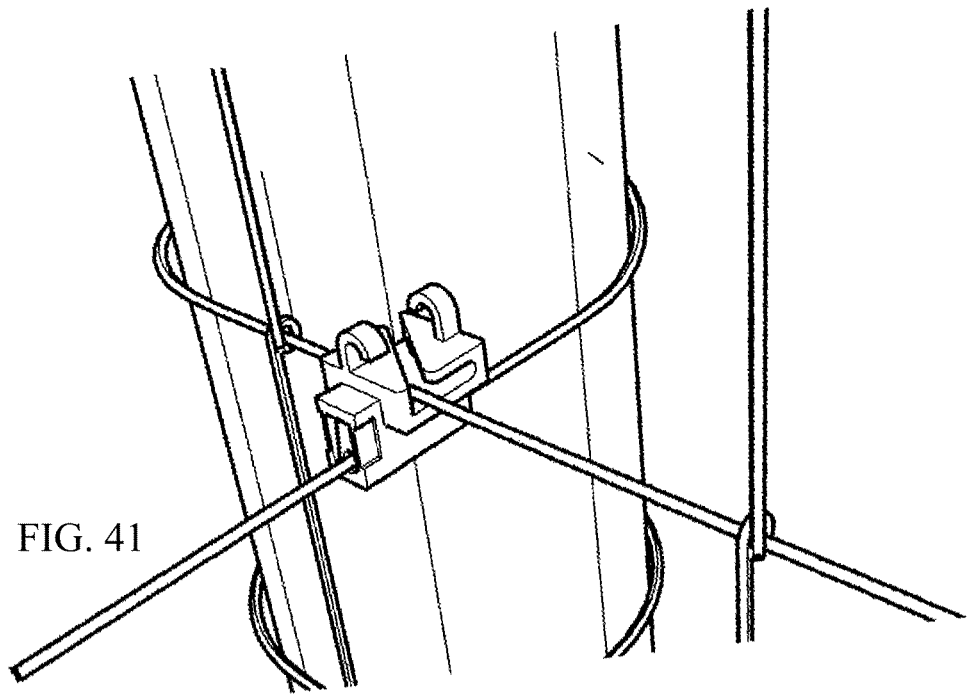
Figure 42:
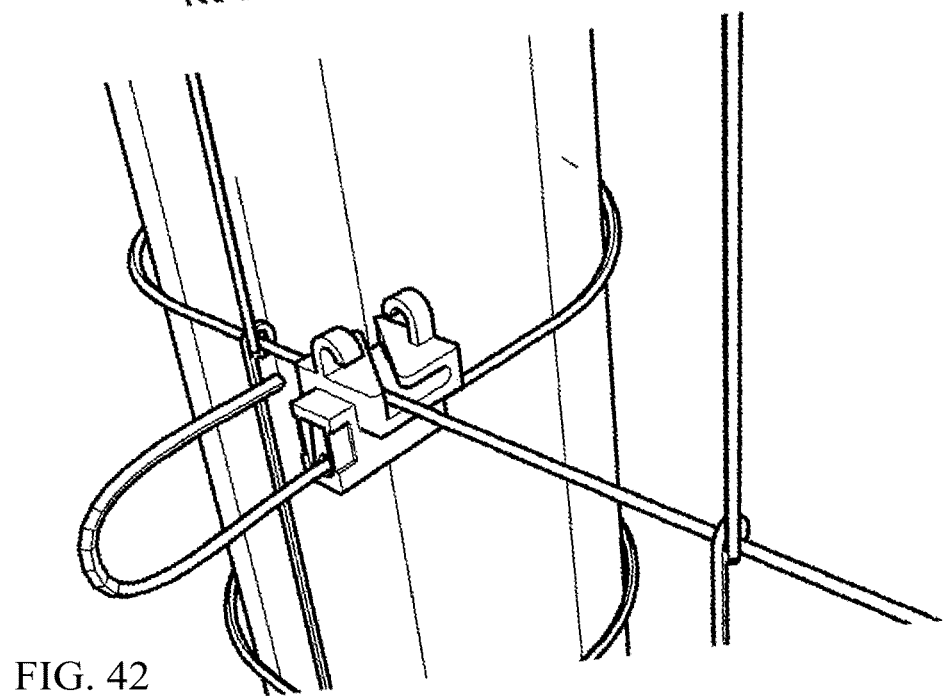
Figure 43:
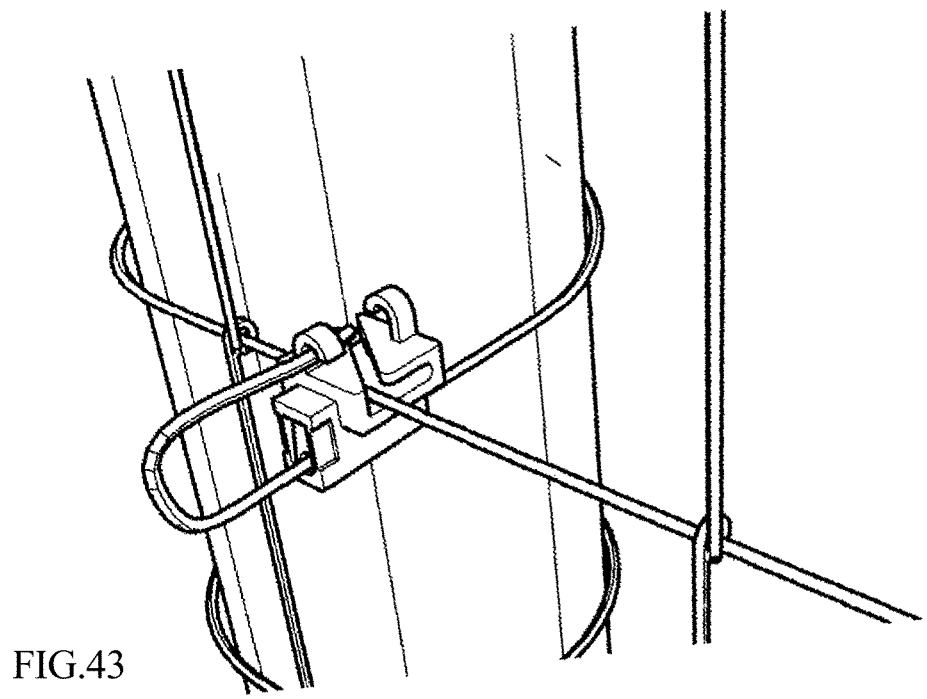
Figure 44:
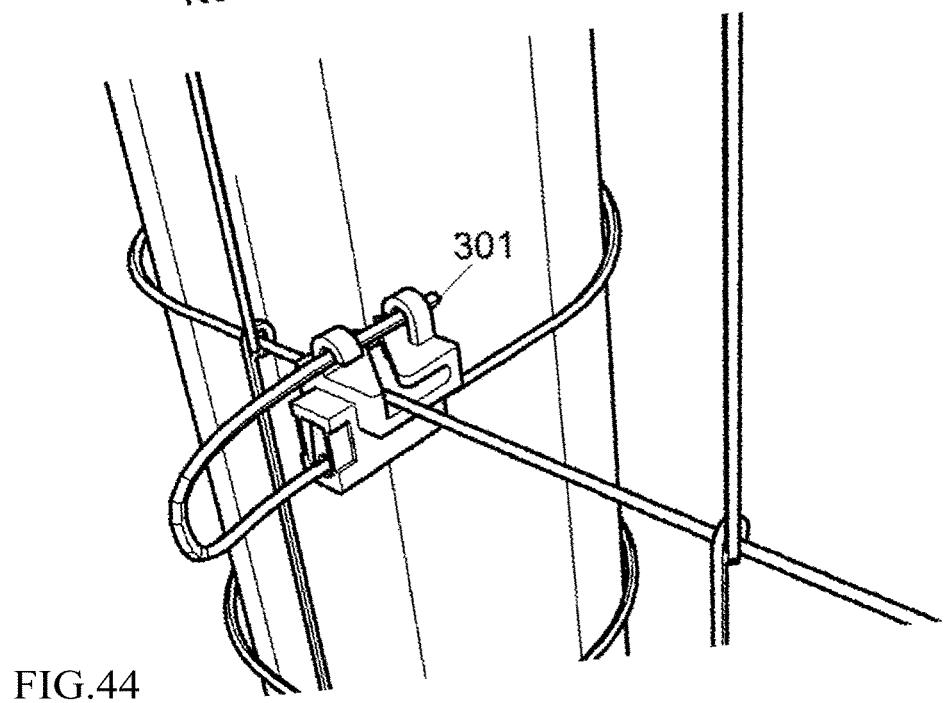

Finally, it can be seen in FIGS. 31 to 33 how a final end 301 of the cable 300 surrounds the post 200 for being introduced in the through hole 8 of the device 100.

Similarly, the same sequence of use can be seen in FIGS. 34 to 44, with the inclusion of an additional step, wherein the final end 301 of the cable 300 which has been introduced through the through hole 8 of the device 100 is again retained in the second engagement elements 10 arranged in the second body 2 of the device 100.

In a particular embodiment, the transverse through hole (8) with respect to the first body (1) is located close to the lower plane of said first body (1). However, in another particular embodiment, the transverse through hole (8) with respect to the first body (1) is located close to the upper plane of said first body (1) and immediately next to the through passage (3).

In another particular embodiment, the second anchoring means are at least two engagement elements (10) the openings of which are aligned with or facing one another.

Finally, in another particular embodiment the second anchoring means are at least two lugs (10*a*) the through openings of which are aligned with one another.

The invention claimed is:

1. A wire terminator device for fences and barriers comprising:
 a first body (1) housing a wire retaining mechanism for retaining a wire; and
 a second body (2) stemming from the first body (1) having an engagement element (3, 4, 5, 5*a*, 6, 6*a*) for retaining the wire in a usage position, the engagement element defined by a through passage (3) in a direction of passage (7) of the wire in the usage position and a single inlet groove (4) that is oblique with respect to the direction of passage (7) of the wire in the usage position;
 wherein the single inlet groove (4) is arranged in a same plane of the direction of passage (7) of the wire in the usage position; and
 wherein the engagement element (3, 4, 5, 5*a*, 6, 6*a*) is configured for the wire to be introduced through the single inlet groove (4) to transition from an inclined position or entry position of the wire to the usage position or non-inclined position of the wire, with the wire being retained in the second body (2) and housed in the engagement element (3, 4, 5, 5*a*, 6, 6*a*).

2. The device according to claim 1, wherein the single inlet groove (4) to the through passage (3) comprises two regions (5, 5*a*) arranged in the same plane and opposite one another and have inner edges (6, 6*a*) of which are arranged in the same plane and parallel to one another and separated by a distance (d) greater than the diameter of the wire (300).

3. The device according to claim 1, further comprising a central transverse groove (9) with respect to the single inlet groove (4) of the second body (2).

4. The device according to claim 1, further comprising a transverse through hole (8) within the first body (1).

5. The device according to claim 1, further comprising a transverse through hole (8) within the first body (1), adjacent the through passage (3).

6. The device according to claim 1, further comprising at least one anchoring element (10, 10*a*) for anchoring the wire (300) arranged on at least one region (5, 5*a*) of the second body (2).

7. The device according to claim 6, wherein the at least one anchoring element is a hook (10).

8. The device according to claim 6, wherein the at least one anchoring element are lugs (10*a*).

9. The device according to claim 6, wherein the at least one anchoring element is at least two engagement elements (10) having openings of which are aligned with one another or facing one another.

10. The device according to claim 6, wherein the at least one anchoring element is at least two lugs (10*a*) having through openings of which are aligned with one another.

11. The device according to claim 1, wherein the second body (2) is arranged to be horizontally aligned on the first body (1).

12. The device according to claim 1, wherein the second body (2) is arranged on the first body (1) and horizontally shifted with respect to the first body (1).

* * * * *